Inventor
Charles A. Robinson
By his Attorney

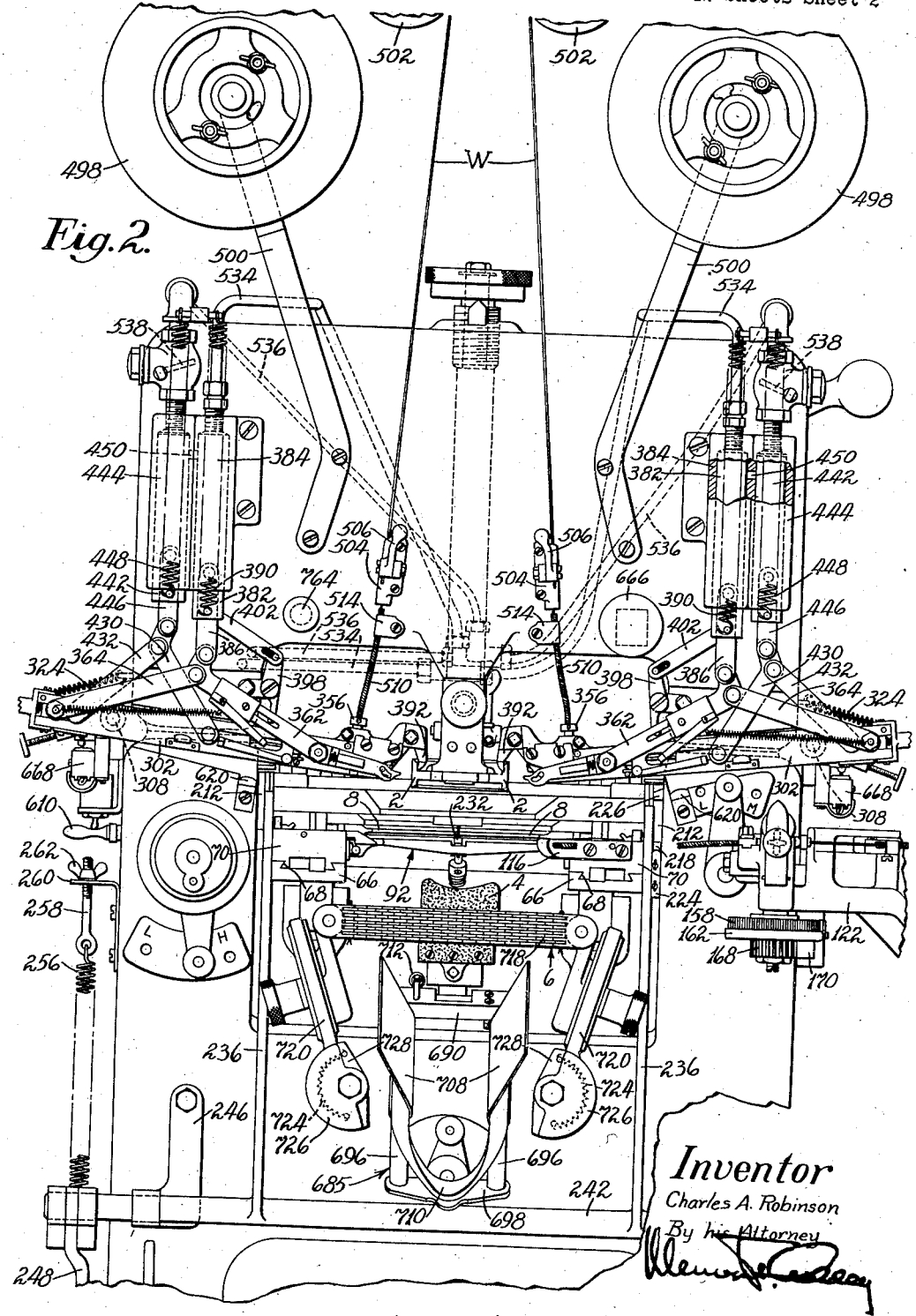

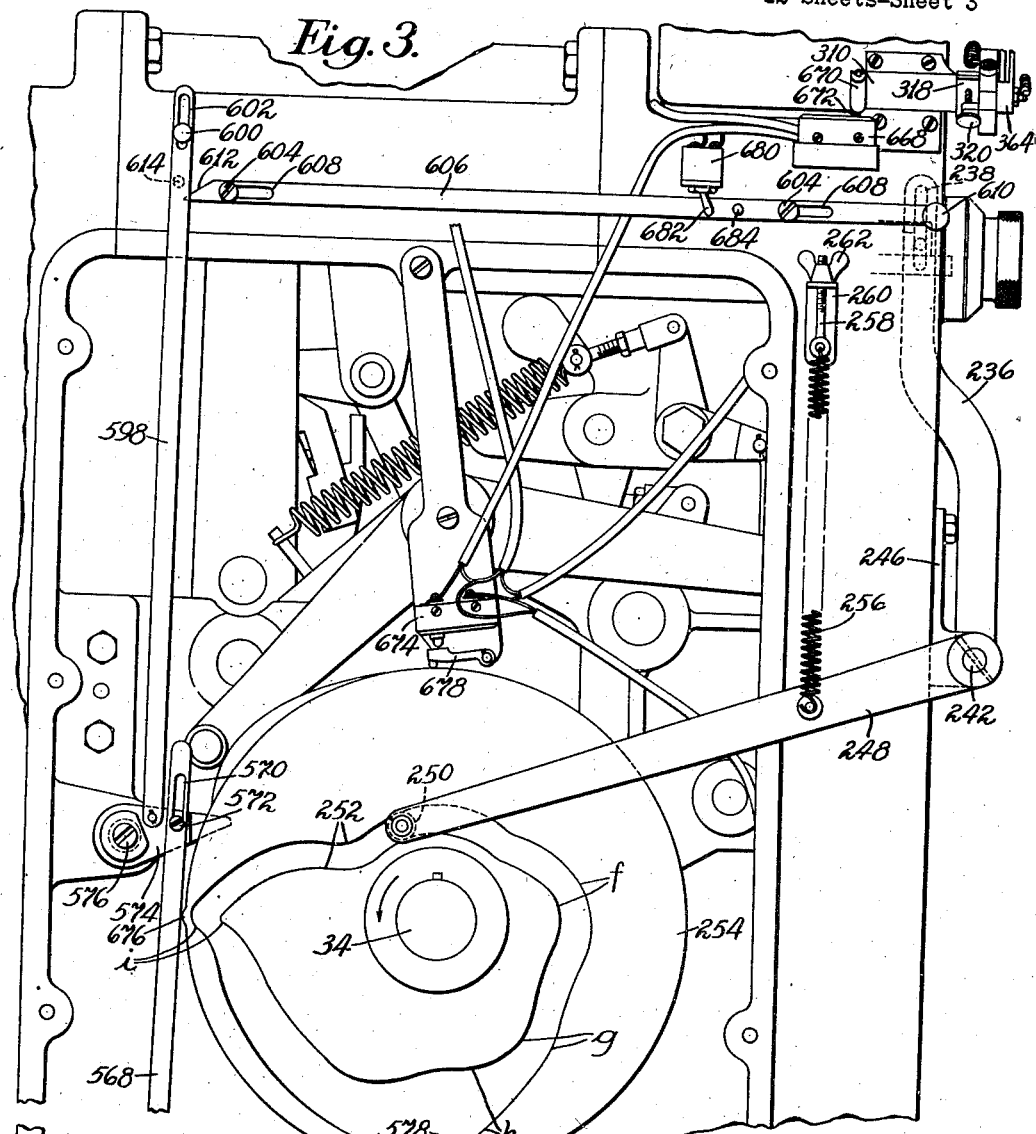
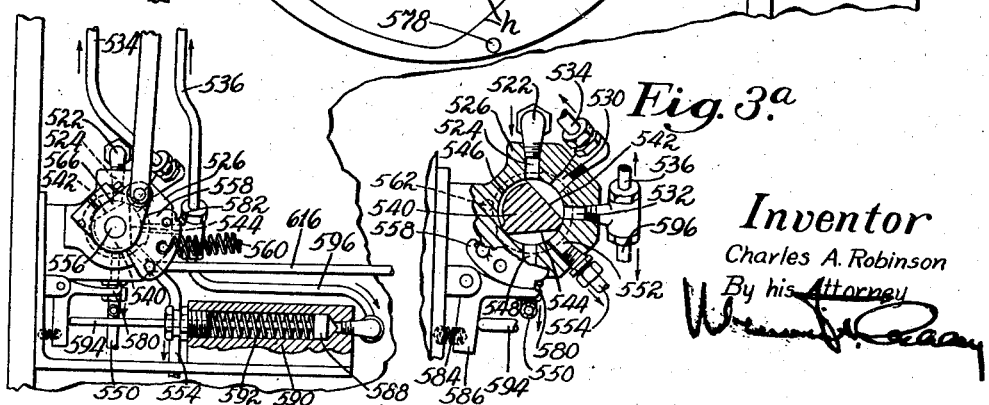

May 20, 1947.                C. A. ROBINSON                2,420,684
           MACHINE FOR USE IN THE MANUFACTURE OF SHOES
              Filed Dec. 20, 1944          12 Sheets-Sheet 4

Inventor
Charles A. Robinson
By his Attorney

May 20, 1947.  C. A. ROBINSON  2,420,684
MACHINE FOR USE IN THE MANUFACTURE OF SHOES
Filed Dec. 20, 1944    12 Sheets-Sheet 5
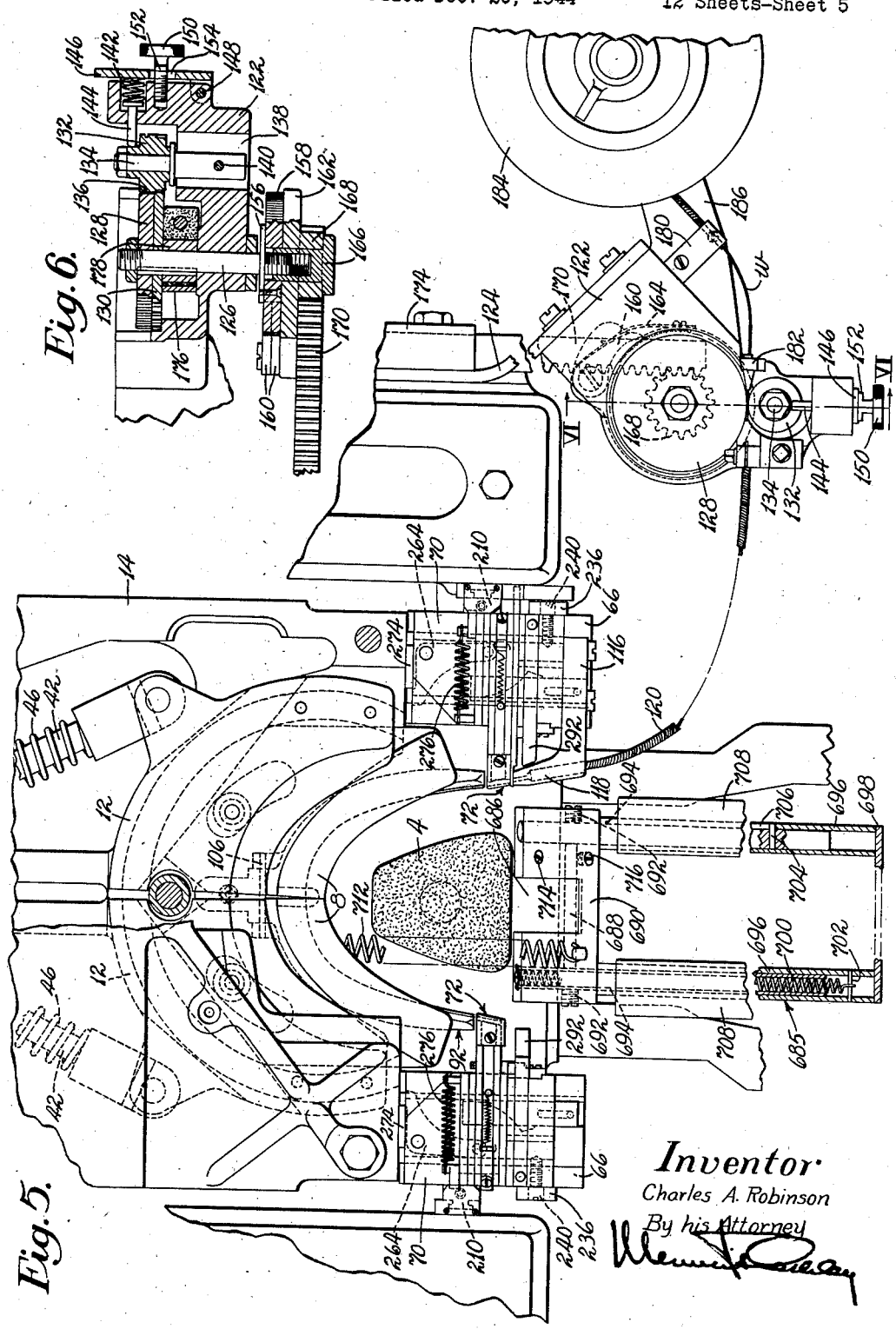
Inventor
Charles A. Robinson
By his Attorney

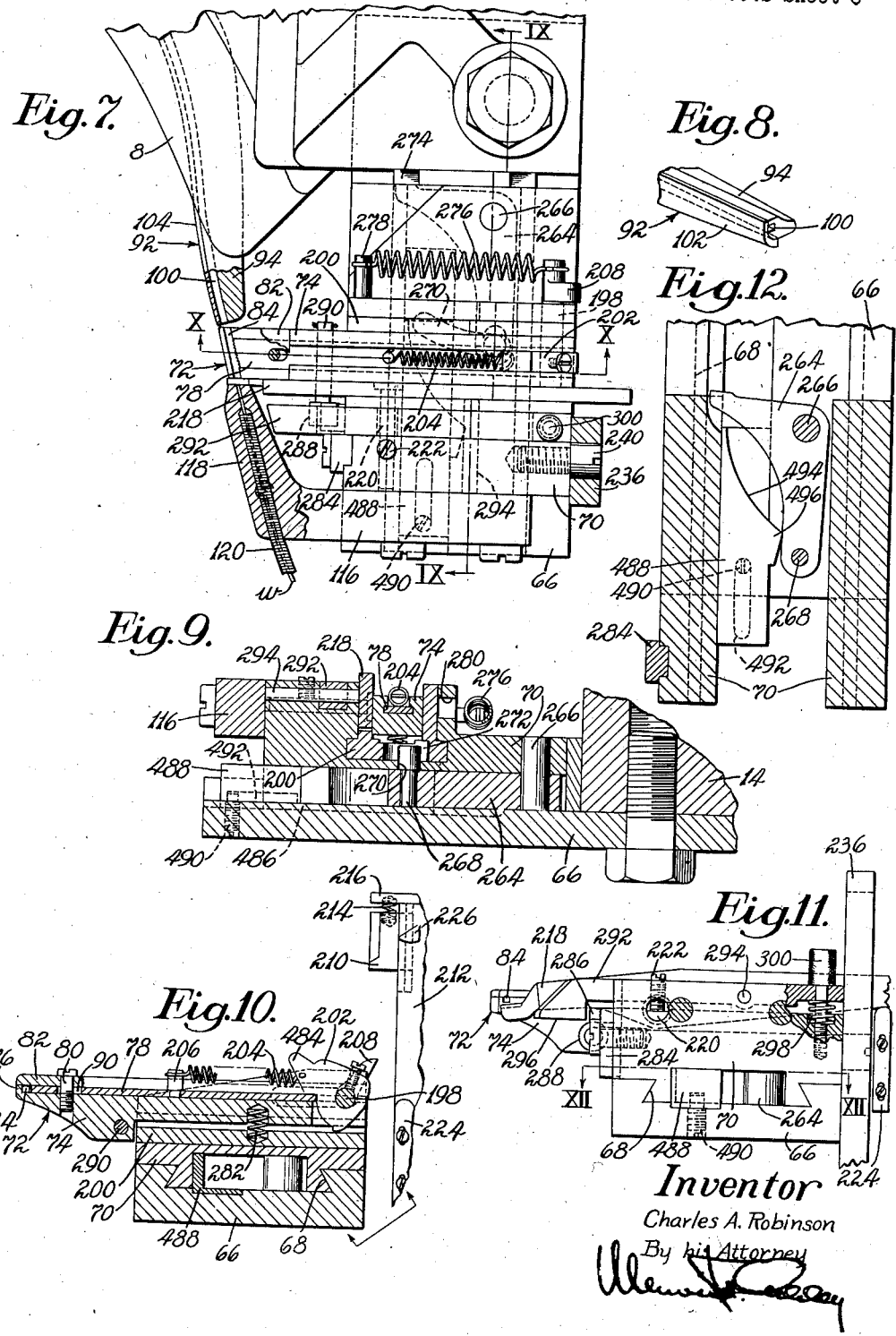

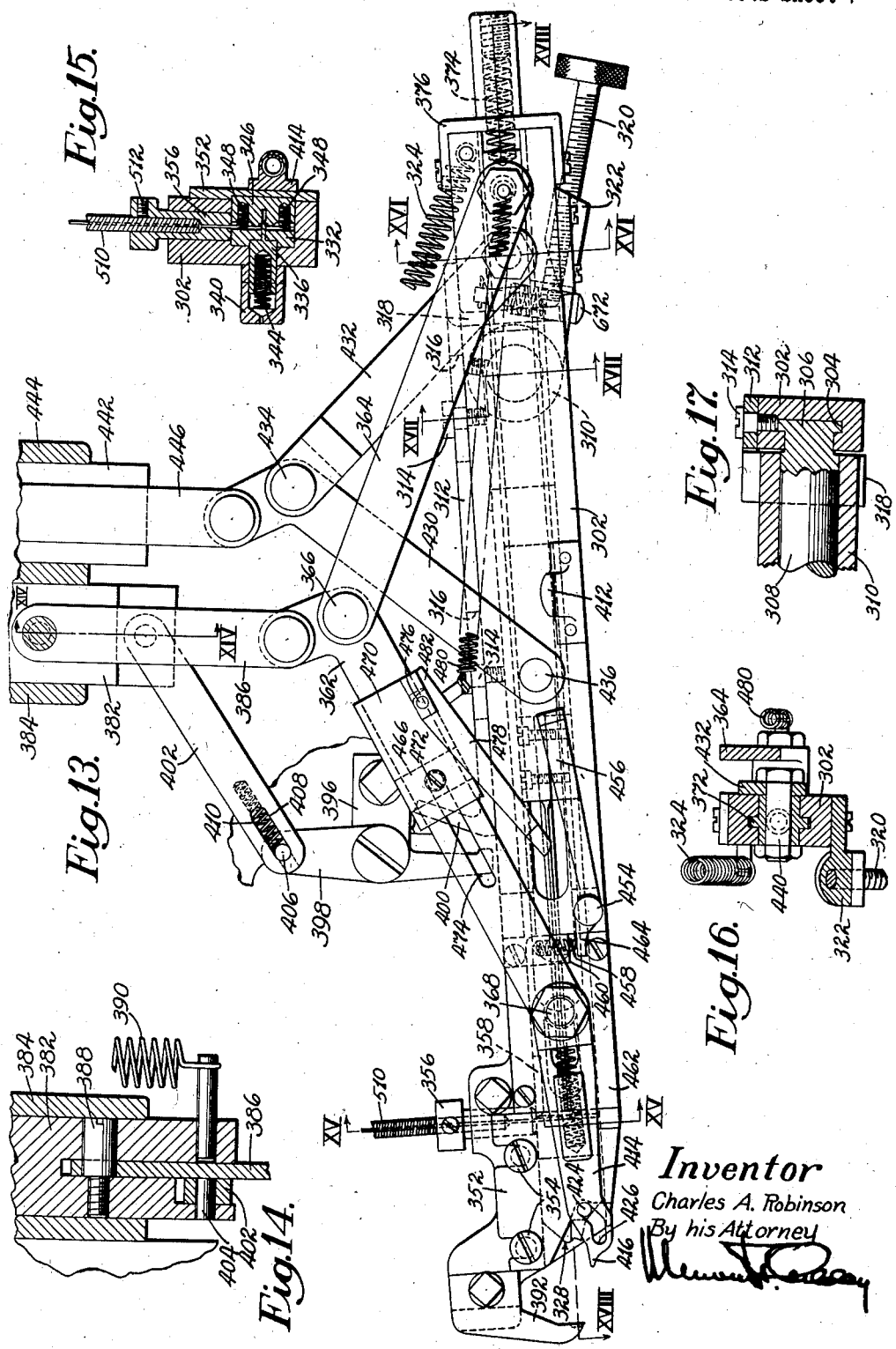

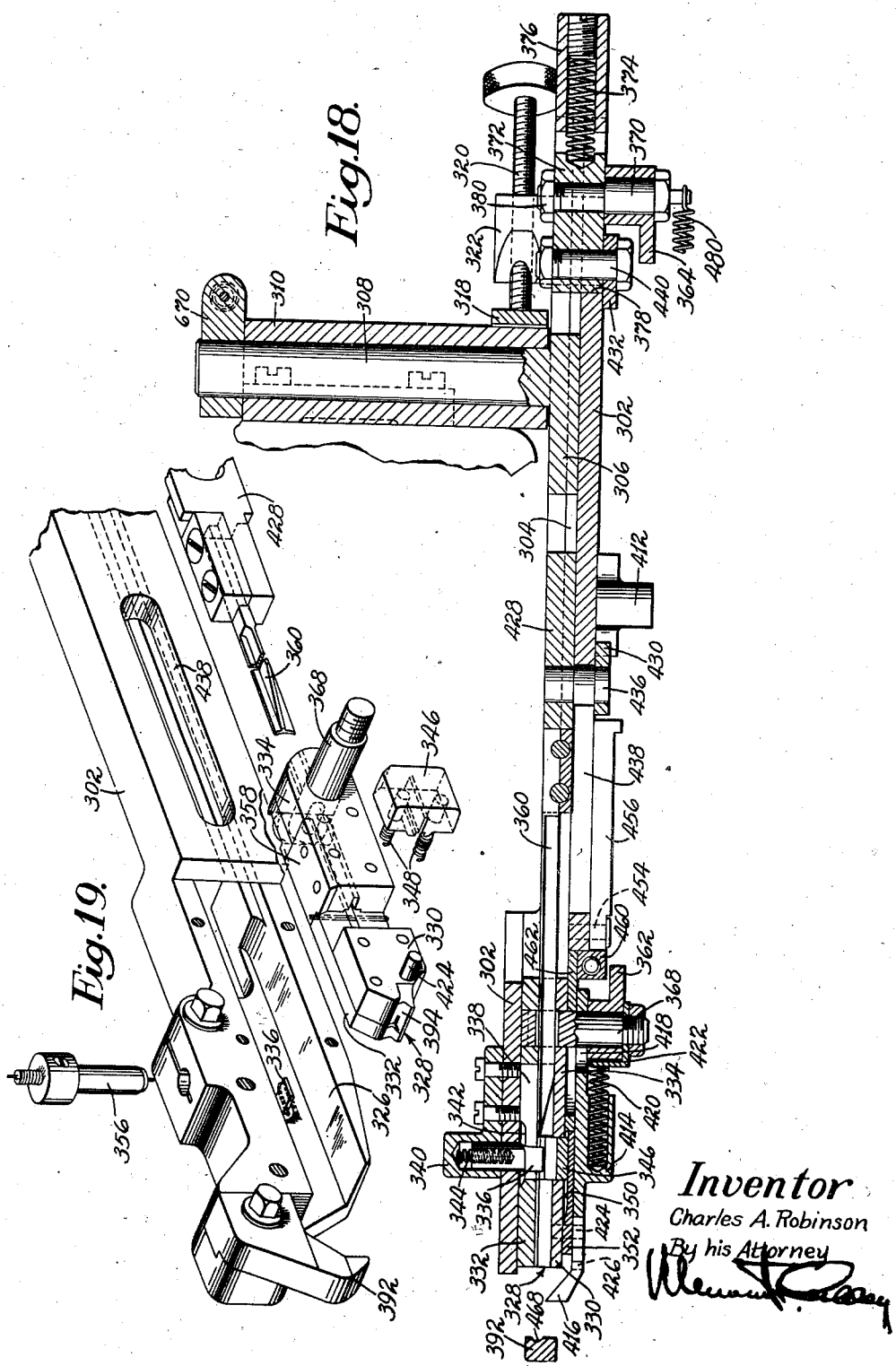

May 20, 1947.  C. A. ROBINSON  2,420,684
MACHINE FOR USE IN THE MANUFACTURE OF SHOES
Filed Dec. 20, 1944   12 Sheets-Sheet 9

Inventor
Charles A. Robinson
By his Attorney

Inventor
Charles A. Robinson
By his Attorney

May 20, 1947.  C. A. ROBINSON  2,420,684
MACHINE FOR USE IN THE MANUFACTURE OF SHOES
Filed Dec. 20, 1944    12 Sheets-Sheet 11
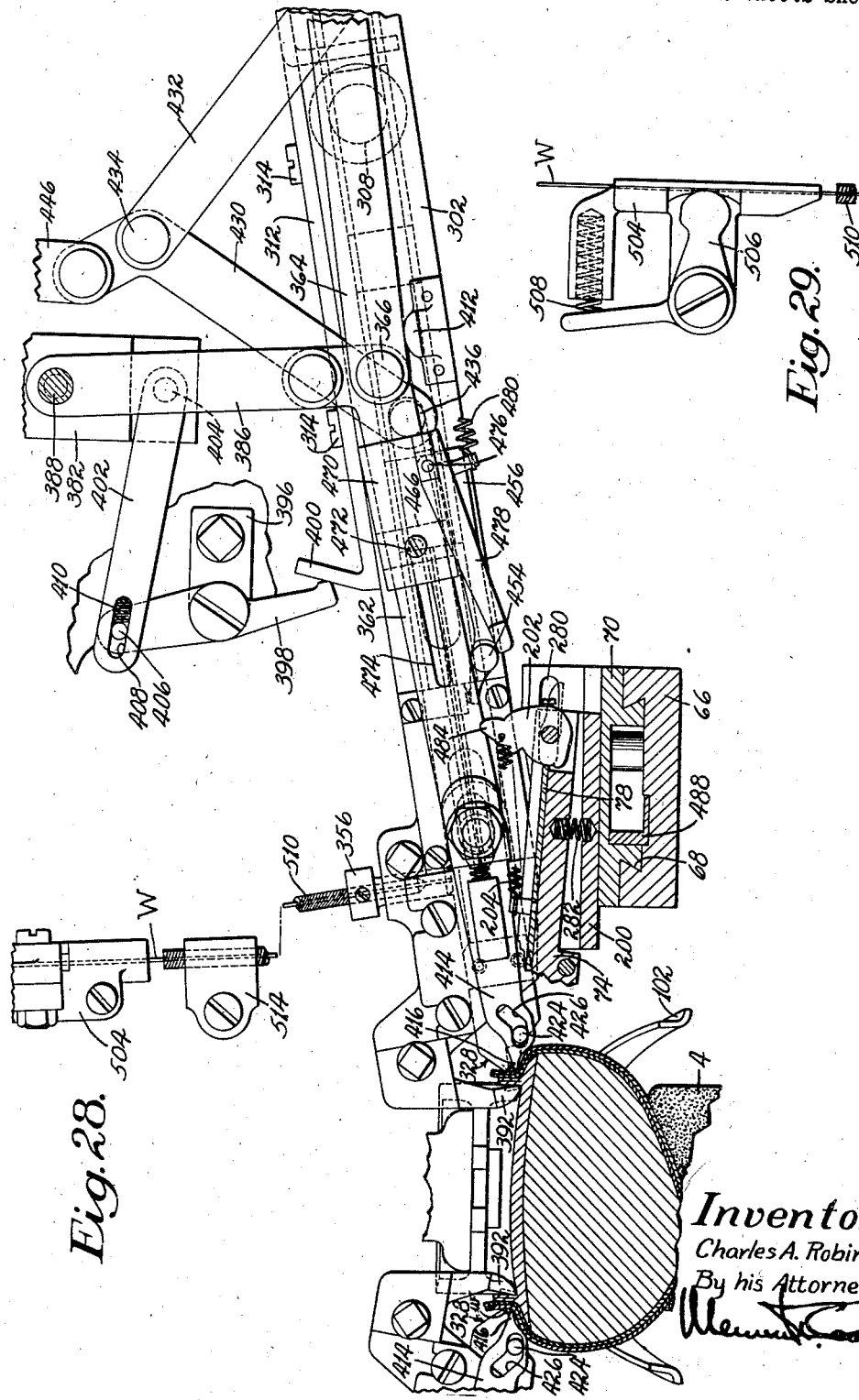
Inventor
Charles A. Robinson
By his Attorney May 20, 1947.　　　　C. A. ROBINSON　　　　2,420,684
MACHINE FOR USE IN THE MANUFACTURE OF SHOES
Filed Dec. 20, 1944　　　12 Sheets-Sheet 12
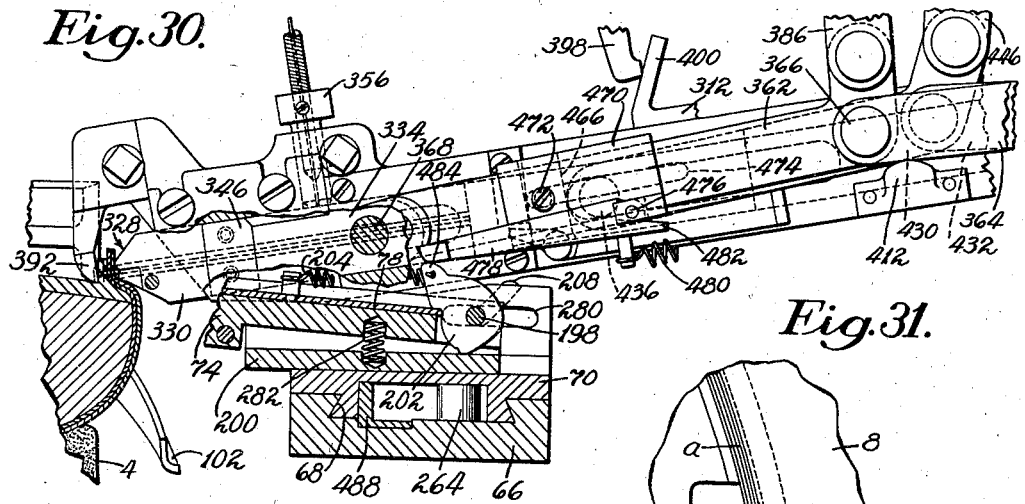
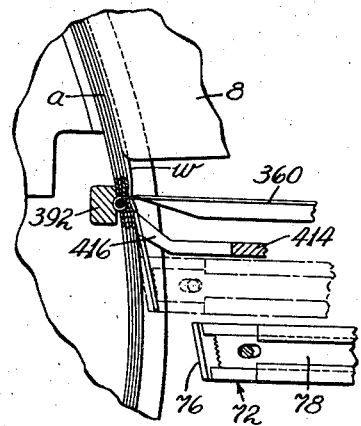
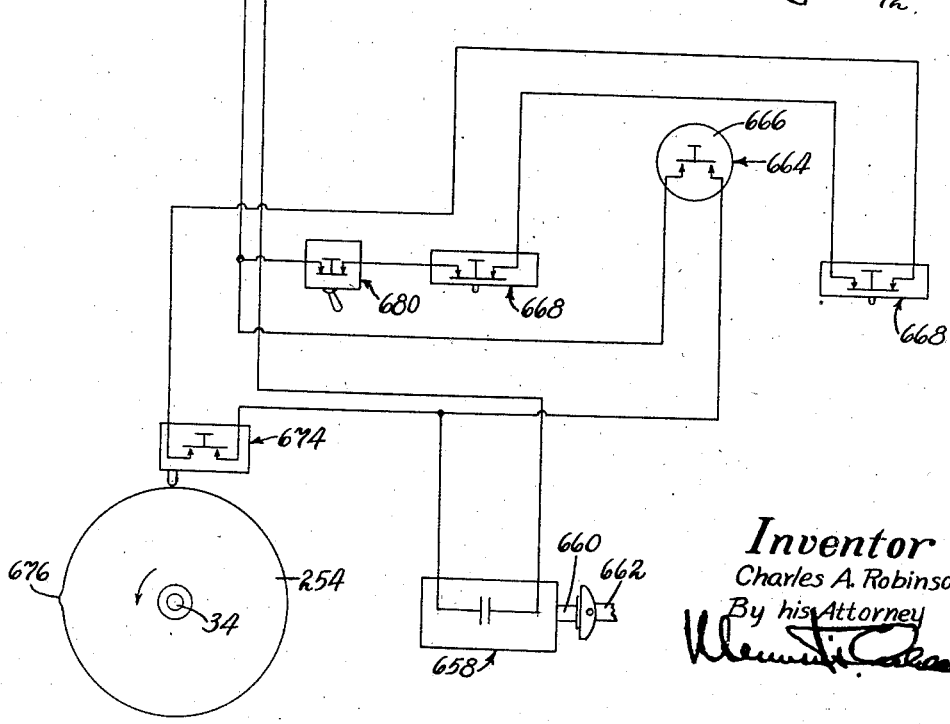
Inventor
Charles A. Robinson
By his Attorney Patented May 20, 1947

2,420,684

UNITED STATES PATENT OFFICE 2,420,684

MACHINE FOR USE IN THE MANUFACTURE OF SHOES

Charles A. Robinson, Salem, Mass., assignor to United Shoe Machinery Corporation, Flemington, N. J., a corporation of New Jersey Application December 20, 1944, Serial No. 568,964

131 Claims. (Cl. 12—4)

This invention relates to machines for use in the manufacture of shoes, and in some aspects more particularly to machines for lasting the toe ends of shoes. The invention is herein illustrated as applied to a power-operated toe-lasting machine which, except as hereinafter noted, is constructed generally as disclosed in United States Letters Patent No. 2,160,846, granted on June 6, 1939, on an application of F. C. Eastman's and A. F. Pym's, but it should be understood that in various novel aspects it is not thus limited in its applicability.

The machine shown in the above-mentioned Letters Patent is provided with wipers supported by a wiper carrier which by movement heightwise of the last in the course of a cycle of power operations of the machine causes the wipers to wipe the toe end of the upper in that direction, the wipers being thereafter advanced and closed to wipe the marginal portion of the upper inwardly over the feather and against the lip of a welt shoe insole on the last. To secure the upper in lasted position the operator applies a binder wire about the toe and fastens it to the shoe, the machine being so controlled as to permit this to be done. An object of the present invention is to relieve the operator of this labor and also to increase the output of the machine by providing automatic means for applying and fastening a binder. For the purpose in view the machine herein shown has a pair of grippers for gripping the ends of a binder at the opposite sides of the shoe respectively, automatic means for feeding binder wire to these grippers and about the toe end of the shoe, and a wire guide having a closed passageway for guiding the wire about the toe from one gripper to the other. The grippers and the wire guide are supported on the wiper carrier, and in response to the movement of the carrier heightwise of the shoe the grippers are closed on the wire, a cutter is operated to cut the wire adjacent to one of the grippers and the wire guide is opened on the side toward the shoe. Thereafter, in proper time relation to the wiping movements of the wipers, the grippers are moved lengthwise of the shoe to pull the binder inwardly along the wiping faces of the wipers and against the margin of the upper opposite the lip of the insole and are also moved widthwise of the shoe to position the ends of the binder beyond the wipers in the angle between the lip and the feather of the insole. The wipers are then operated to press the binder more firmly against the upper, whereupon the cycle of operations of the machine is interrupted.

To fasten the binder to the shoe the invention further provides fastening-inserting mechanisms, herein frequently termed stapling units, which in the construction shown are operated by fluid-pressure means in the pause in the cycle of operations after its interruption as above described to form staples and to drive them in directions widthwise of the shoe through the margin of the upper and the lip of the insole, the operations of the units being initiated automatically prior to the pause in the cycle. The units include anvils for clinching the staples on the inner face of the lip in directions toward the heel end of the shoe, and they are first moved heightwise of the shoe by the fluid-pressure means to positions determined by engagement of these anvils with the insole, after which the anvils are moved outwardly against the lip. Also included in the units are throat members movable inwardly against the margin of the upper for guiding the staples, staple-forming members movable with the throat members to form the staples, and cutters movable with the staple-forming members to cut from strands of wire pieces from which the staples are formed, these parts of each unit being operated through a toggle by the fluid-pressure means. Because of resistance of the wire initially to the movements of the cutters the units are first moved heightwise of the shoe as above described by the means acting on the toggles without any substantial straightening of the toggles, after which the resistance of the shoe to further movements of the units causes the toggles to be straightened to cut the wire, form the staples and move the throat members into engagement with the upper. The engagement of the cutters with the wire as the units are moved heightwise of the shoe serves to feed the wire, and portions thus fed are received within the units for use in forming the next staples in the return of the units thereafter to starting positions. Associated with the throat members are devices which are movable inwardly with them and by engagement with the binder insure that the portions thereof engaged by the staples will be properly positioned relatively to the staple-guiding passages in the throat members. The staples are driven by drivers to which operative movements are imparted by other fluid-operated toggles, these toggles being adjusted automatically through connections with the first-mentioned toggles to determine the limits of the operative movements of the drivers in accordance with the positions of the throat members when in engagement with the upper. In response to the movements of the driver-operating toggles the grippers are opened to release the binder, and they are then moved farther lengthwise of the shoe to clear the binder and outwardly away from the shoe to prevent contact therewith as they are returned to their starting positions. After the driving of the staples, increase of pressure of the operating fluid serves to effect release of the fluid from the fluid-pressure means, whereupon the parts of the stapling units are returned to their starting positions and the units are moved reversely away from the shoe. Through electrically controlled clutch-actuating means the units by their reverse movements cause the machine to resume and complete its cycle of operations. The construction shown further includes means whereby, if desired for any reason, as for test purposes, the machine may be run without operating the stapling units, or the units themselves may be operated independently of a cycle of operations of the machine. In the means thus briefly outlined for applying a binder and for fastening it to a shoe various novel features of the invention are to be recognized.

The above and other features of the invention, including various novel details of construction and combinations of parts, will now be more particularly described with reference to the accompanying drawings and thereafter pointed out in the claims.

In the drawings,

Fig. 2 is a view in front elevation of the upper portion of the machine, with parts broken away;

Fig. 3 is a view in left-hand side elevation of the lower portion of the machine, with parts broken away;

Fig. 3a is mainly a vertical sectional view of a valve shown in Fig. 3, and of parts associated therewith;

Fig. 5 is mainly a plan view showing the wipers and portions of the binder-applying means;

Fig. 6 is a section on the line VI—VI of Fig. 5;

Fig. 7 is mainly a plan view on a larger scale than Fig. 5 of that portion of the binder-applying means which is located at the right-hand side of the shoe;

Fig. 8 is a detail perspective view of an end portion of a wire guide shown in Fig. 7;

Fig. 9 is a section on the line IX—IX of Fig. 7;

Fig. 10 is mainly a section on the line X—X of Fig. 7;

Fig. 11 is a view in front elevation of the structure shown in Fig. 7, with one part removed and other parts broken away;

Fig. 12 is a section on the line XII—XII of Fig. 11;

Fig. 13 is a view in front elevation, on a larger scale, of the right-hand stapling unit shown in Fig. 2;

Fig. 14 is a section on the line XIV—XIV of Fig. 13;

Fig. 15 is a section on the line XV—XV of Fig. 13;

Fig. 16 is a section on the line XVI—XVI of Fig. 13;

Fig. 17 is a section on the line XVII—XVII of Fig. 13;

Fig. 18 is a section on the line XVIII—XVIII of Fig. 13;

Fig. 19 is an exploded view of portions of the right-hand stapling unit;

Fig. 28 is a view partly in front elevation and partly in section, showing portions of the stapling units in positions to drive the staples after the staples have been formed;

Fig. 29 is a view in side elevation of one of the devices for controlling the wire fed to the stapling units;

Fig. 30 is a view similar to Fig. 28, but with parts broken away, showing portions of the right-hand stapling unit as the parts appear after the staple has been driven;

Fig. 31 is mainly a plan view, with parts removed and a portion of the shoe broken away to show one of the staples as it appears when the staple driver is at the end of its driving movement; and Fig. 32 is a diagrammatic view illustrating how the starting of the machine is effected electrically.

Figure 20:
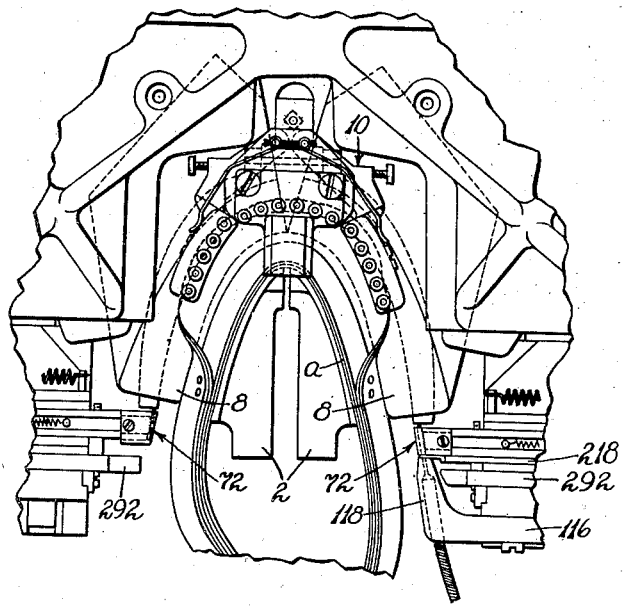
Fig. 20 is a plan view showing the wipers and portions of the binder-applying means as they appear after the wire has been fed and when the wipers are ready to begin their movements to wipe the upper inwardly over the insole.

In view of the disclosures in the previously mentioned Letters Patent No. 2,160,846 and in other Letters Patent hereinafter mentioned, the present description will be confined to such portions of the machine as it is necessary to refer to for an understanding of the invention. The welt shoe is positioned for the toe-lasting operation by a device which is herein shown, by way of example, as constructed substantially as disclosed in Letters Patent No. 2,388,367, granted on November 6, 1945 on an application of mine, this device including a pair of plates 2 (Fig. 20) relatively adjustable for shoes of different sizes and styles and arranged to engage the bottom face of the toe end of the insole adjacent to its lip $a$ to position the shoe heightwise and also to engage the inner face of the lip at the end and sides of the toe to position it lengthwise and laterally. The shoe is thus positioned as determined by these plates when it is presented to the machine by the operator, and shortly after the starting of the cycle of power operations of the machine it is clamped against the plates by a toe rest 4 which is moved upwardly into clamping position. To assist in controlling the shoe, there is also provided a heel rest 6 (Fig. 1) which is moved rearwardly into engagement with its heel end face early in the cycle of operations. For lasting the toe end of the shoe the machine has a pair of wipers 8 which are advanced and closed to embrace the upper about the toe end of the last and are swung upwardly to wipe the upper heightwise of the last, after which they are further advanced and closed to wipe the marginal portion of the upper inwardly over the feather and against the lip of the insole, the lip being supported against the inward pressure of the wipers by the plates 2. In the machine herein shown, the grippers disclosed in Letters Patent No. 2,160,846 for applying a pull to the toe end of the upper and for controlling it in the toe-lasting operation are dispensed with, and instead of such grippers there is provided a device indicated generally by the reference character 10 (Figs. 20 and 23) and herein termed a retarder, this device being arranged to clamp the marginal portion of the upper outspread on the top faces of the wipers 8 and thus to cooperate with them in applying a pull to the upper as it is wiped heightwise of the last and to assist in controlling it in the lasting operation. The retarder is herein shown, by way of example, as constructed and operated substantially as disclosed in Letters Patent No. 2,397,624, granted on April 2, 1946 on another application of mine. The retarder clamps the upper on the wipers by the time they begin to wipe it heightwise of the last and releases it just after the wipers begin their movements to wipe its marginal portion inwardly over the insole.

Figure 4:
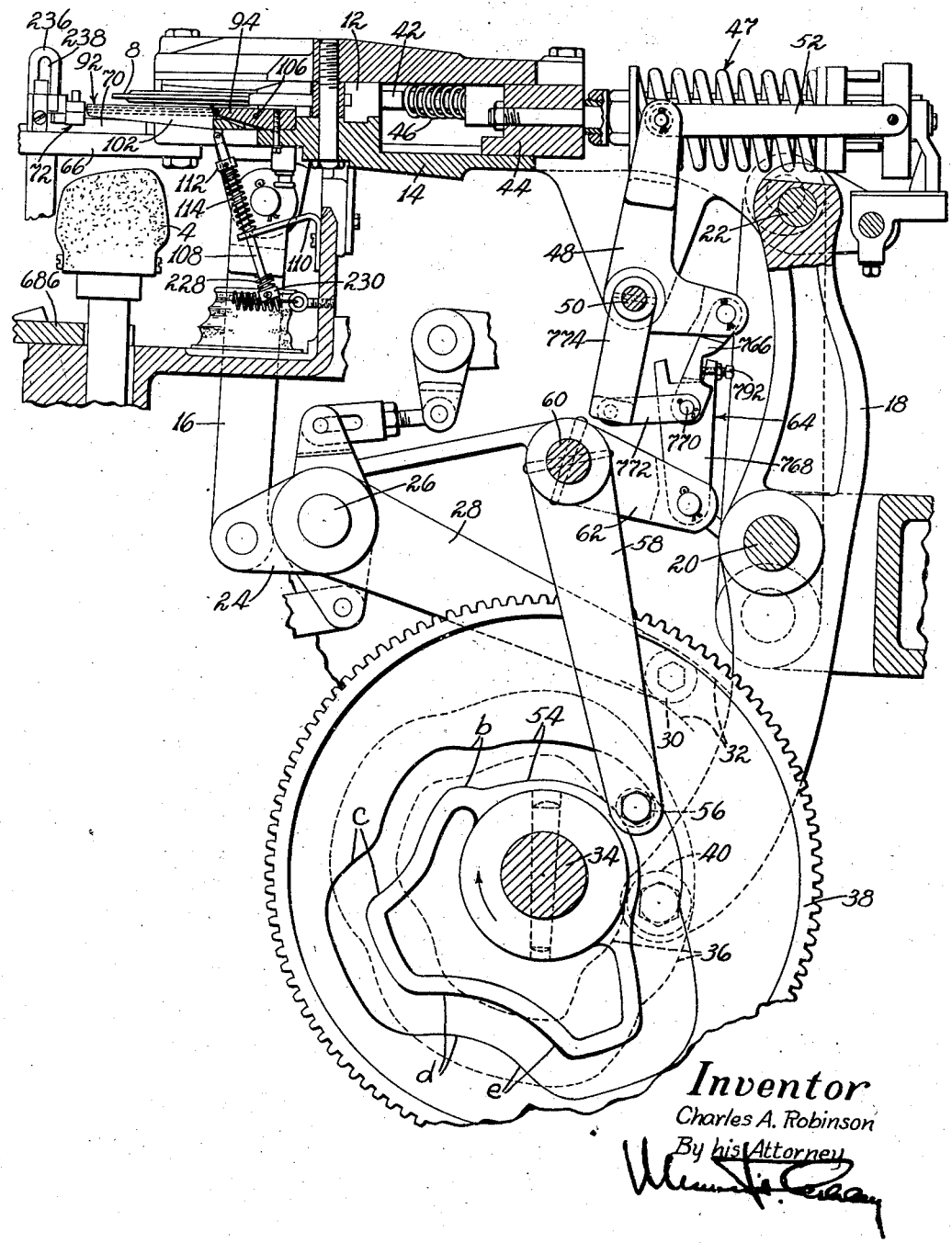
Fig. 4 is a view partly in right-hand side elevation and partly in section, showing the wiper-operating mechanism and parts associated therewith.

While the wipers 8 are operated and controlled by mechanism which is for the most part like that disclosed in Letters Patent No. 2,160,846, this mechanism will now be briefly described for a better understanding of the present invention. The wipers are secured to wiper holders 12 (Fig. 5) which are supported on a wiper carrier 14 and are guided by the carrier for movements about an axis extending heightwise of the shoe substantially at the end of the toe to close the wipers inwardly widthwise of the shoe. The wiper carrier is supported at its front end for movements to advance and retract the wipers lengthwise of the shoe on a pair of links 16 one of which is shown in Fig. 4, the links being spaced apart widthwise of the shoe and pivotally connected at their upper ends to the carrier. At its rear end the wiper carrier is further supported on the upper end of a lever 18 which is pivotally mounted between its upper and lower ends on a fulcrum rod 20. The upper arm of the lever 18 is pivotally connected by a rod 22 to the wiper carrier and, in effect, serves as a link substantially parallel to the links 16. The links 16 are pivotally connected at their lower ends to arms 24, only one of which is shown, these arms being fast on a rockshaft 26 mounted in bearings in the frame. Also fast on the rockshaft 26 is an arm 28 provided with a roll 30 which lies in a cam track 32 formed in one side of a cam member (not shown) fast on a cam shaft 34. Only a fragment of this cam track is herein shown by dotted lines, but it corresponds to the cam track 190 of Letters Patent No. 2,160,846. Through this mechanism the wiper carrier 14 is swung upwardly about the rod 22 to cause the wipers to wipe the upper heightwise of the last and is later operated to increase the downward pressure of the wipers on the marginal portion of the upper over the insole. To advance and retract the wiper carrier and the wipers lengthwise of the shoe, the lever 18 is swung about the rod 20 by a cam track 36 formed in one side of a gear wheel 38 on the cam shaft 34, the lever carrying a roll 40 which lies in the cam track. It will be understood that when the wiper carrier is thus operated the links 16 swing idly about their pivotal connections with the arms 24. Through spring means not herein shown but fully disclosed in Letters Patent No. 2,160,846 provision is afforded for yield to prevent damage to the shoe or to the machine when the upstanding margin of the upper is pressed against the lip of the insole by the action of the lever 18 on the wiper carrier.

The wiper holders 12 are operated to close the wipers inwardwly widthwise of the shoe through links 42 (Figs. 4 and 5) connected respectively to the different holders and both connected to a slide 44 mounted for movements lengthwise of the shoe on the wiper carrier 14. Associated with these links are comparatively light springs 46 through which the wipers are pressed yieldingly against the sides of the toe in the wiping of the upper heightwise of the last. As disclosed in the last-mentioned Letters Patent, the yield of these springs is limited to render the slide 44 positive in its action on the wiper holders 12 when the upper is thereafter pressed inwardly by the wipers against the lip of the insole. Through spring mechanism 47, the construction of which need not be herein described in detail, the slide 44 is operated to close the wipers by a bell-crank lever 48 mounted to swing about a shaft 50 on the wiper carrier 14, this bell-crank lever being connected by a pair of links 52, only one of which is herein shown, to the spring mechanism. This spring mechanism is yieldable to prevent damage to the shoe or to the machine when the upper is pressed against the lip of the insole by the closing of the wipers. The bell-crank lever 48 is operated by a cam track 54 formed in one side of the gear wheel 38 and acting on a roll 56 carried by an arm 58 which is fast on a rockshaft 60 on the frame. Also fast on this rockshaft is an arm 62 connected to the bell-crank lever 48 by means indicated generally by the reference character 64. As hereinafter described in detail, this connecting means is different from that disclosed in the last-mentioned Letters Patent. It is sufficient to state at this point that when movement in a counterclockwise direction (Fig. 4) is imparted to the arm 58, corresponding movement is imparted to the bell-crank lever 48 to close the wipers in time relation to their advancing movements lengthwise of the shoe, and that when reverse movement is imparted to the arm 58 the wipers are opened. By the portion b of the cam track 54 the wipers are partially closed for the wiping of the upper heightwise of the last, and by the portion c of the cam track they are thereafter further closed to wipe the marginal portion of the upper inwardly over the insole, these movements being accompanied by corresponding bodily movements of the wipers lengthwise of the shoe. The receding portion d of the cam track later serves partially to open the wipers simultaneously with partial retractive movements thereof lengthwise of the shoe, the downward pressure of the wipers on the upper having been somewhat relieved at that time by the action of the cam track 32 on the wiper carrier 14. Thereafter the portion e of the cam track 54 again closes the wipers simultaneously with a second advance thereof lengthwise of the shoe. In time relation to the second advancing and closing movements of the wipers they are again moved downwardly to increase their pressure on the upper. For a still better understanding of the manner in which the wipers are thus operated and controlled Letters Patent No. 2,160,846 may be consulted.

According to the disclosure of the above-mentioned Letters Patent the machine therein shown came automatically to a stop when the wipers were at the limits of their first overwiping movements to permit the operator partially to apply a binder wire about the toe, and came again to a stop when the wipers were at the limits of their second overwiping movements to permit the operator to fasten the binder to the shoe. In view of the provision by the present invention of automatic binder-applying means, the first stop in the cycle of operations of the machine is omitted, and between the beginning and the end of the cycle there is an interruption only at that point in the cycle corresponding to the above-mentioned second stop of the earlier machine to provide time for the automatic fastening of the automatically applied binder.

Figure 21:
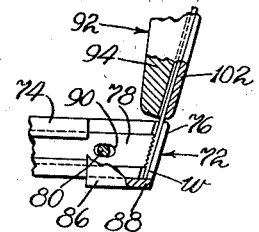
Fig. 21 is a plan view of a portion of the binder-applying means at the left-hand side of the shoe, with parts broken away.

For purposes of this invention there is secured to the lower face of the wiper carrier 14 at the opposite sides of the front end portion thereof two forwardly extending plates 66 (Figs. 2 and 4) each having therein a dovetailed guideway 68, and supported on each plate for movements in directions lengthwise of the shoe along this guideway is a slide 70. Each slide 70 supports a gripper 72 (Fig. 5) movable thereon as hereinafter described in directions widthwise of the shoe. Each gripper includes a bar 74 (Figs. 7, 9 and 10) arranged to extend widthwise of the shoe and having at its inner end an upstanding lip 76 (Fig. 10) which serves as one of the jaws of the gripper. Mounted in guideways on the bar 74 is a slide 78 the inner end of which has teeth thereon and serves as the other jaw of the gripper. Secured by a screw 80 to the top of the inner end of the bar 74 of the right-hand gripper is a cap 82 which cooperates with the other parts described to provide a passageway 84 through which toe binder wire w is fed as hereinafter described. By means also presently to be described the wire is guided to move in a curved path below the wipers from the right-hand gripper to the left-hand gripper and to enter the space between the jaws of the latter (Fig. 21). Secured also by a screw 80 on the top of the inner end of the left-hand gripper bar 74 is a cap 86 which, as distinguished from the previously mentioned cap 82 of the right-hand gripper, has a downwardly extending wall 88 to serve as a stop for the end of the binder wire and thus to limit the feed of the wire. The slide 78 of each gripper has therein a slot 90 through which the screw 80 extends to permit movements of the slide to grip and to release the wire.

To direct the wire from the right-hand gripper to the left-hand gripper there is provided a wire guide 92 which includes a substantially U-shaped member 94 having a rearward extension 96 (Figs. 23 and 24) secured by a screw 98 in a recess in the wiper carrier 14. The member 94 has therein a guideway 100 (Fig. 7) for the wire. Arranged normally to close this guideway on the side toward the shoe is another substantially U-shaped member 102 having an upwardly extending flange 104 (Fig. 23) which lies in front of the guideway 100 when the member 102 is in its normal position. By means of a pin 106 the member 102 is hinged on the rearward extension 96 of the member 94. Pivotally connected to the intermediate portion of the member 102 is a rod 108 extending downwardly through an opening in a bracket 110 (Fig. 4) on the frame of the machine. Between this bracket and a collar 112 fast on the rod 108 is a spring 114 through which the member 102 is held in position to close the guideway in the member 94 when the wiper carrier is in its initial position, as shown in Fig. 4. After the wire has been fed into the wire guide 92 it is positioned a short distance below the lower faces of the wipers, as illustrated.

Secured on the front end of the right-hand gripper-carrying slide 70 is a bar 116 (Fig. 7) having a rearwardly extending portion 118 which serves as a wire-guiding nozzle in alinement with the passageway 84 between the jaws of the right-hand gripper 72 when the parts are in their initial positions. From this nozzle a flexible wire guide 120 leads to wire-feeding mechanism shown in Figs. 5 and 6. This mechanism includes a casting 122 fast on a bracket 124 supported on the right-hand side of the frame, and rotatably mounted in the casting is a vertical shaft 126 on which is keyed a wire feed wheel 128 having wire-engaging teeth on its periphery. Also keyed on the shaft below the feed wheel is a gear wheel 130 in engagement with gear teeth formed on a smaller wire feed wheel 132 rotatably mounted on a pin 134. The wheel 132 has therein a groove 136 for guiding the wire. A diametrically enlarged portion of the pin 134 extends downwardly into a slot 138 in the casting 122 and is pivotally mounted on a pin 140 to permit the feed wheel 132 to be swung away from the other feed wheel 128 if desired. Normally the wheel 132 is pressed toward the wheel 128 by a spring 142 in engagement with the head of a pin 144 which is slidingly mounted in the casting 122 and bears at one end against a hub portion of the wheel 132. This spring is held under compression by a plate 146 which is pivotally mounted at 148 on the casting 122 to permit release of the spring when it is desired to swing the feed wheel 132 away from the wheel 128. A screw 150 threaded in the casting has thereon a crossbar 152 for holding the plate 146 in its normal position, this crossbar being movable by the screw to a position in alinement with a slot 154 in the plate 146 when it is desired to release the plate. Secured to a flange 156 which is fast on the shaft 126 is a ratchet wheel 158 engaged by a pair of staggered pawls 160 pivotally mounted on a pawl carrier 162 and pressed by a spring 164 against the ratchet wheel. The pawl carrier is rotatable about a thimble 166 which is threaded on the lower end of the shaft 126 and turns therewith, and integral with the pawl carrier is a pinion 168 which rests on the enlarged head of the thimble. This pinion is engaged by a rack bar 170 guided by a lug 172 (Fig. 1) on the frame of the machine and by a plate 174 fast on the frame. By forward movement of the rack bar the feed wheels are operated to feed the wire and by rearward movement thereof reverse turning movement is imparted to the pawl carrier 162. To guard against reverse movement of the shaft 126 there is a band brake 176 supported on the casting 122 below the gear wheel 130 and engaging a drum 178 fast on the shaft. The wire in its passage to the feed wheels passes through guide members 180 and 182 and is supplied from a reel 184 supported by an arm 186 on the casting 122. The rack bar 170 is operated by a lever 188 (Fig. 1) which is pivotally mounted at its lower end on a lug on the frame and at its upper end has a pin-and-slot connection with the rack bar. Operative movement is imparted to the lever by a cam 190 fast on the cam shaft 34, this cam engaging a roll 192 on the lever. A spring 194 connected to the lever 188 serves to impart return movement to the lever when permitted by the cam, the return movement of the rack bar 170 being limited by engagement of a pin 196 thereon with the lug 172. The cam 190 is so arranged that the wire is fed into the wire guide 92 early in the cycle of operations, the feeding movement of the wire being limited, as hereinbefore explained, by engagement of its end with the member 88 of the left-hand gripper 72 (Fig. 21). When the feeding of the wire is thus stopped the feed wheels, during any further movement thereof, slip on the wire.

The wire fed as above described into the wire guide 92 and between the jaws of the grippers 72 is carried upwardly with the wipers when the wiper carrier 14 is swung upwardly to cause the wipers to wipe the upper heightwise of the last. In response to the upward movement of the wiper carrier, substantially at the end of that movement, the grippers are caused to grip the wire, as will now be explained. The bar 74 of each gripper is pivotally mounted at its outer end for upward and downward swinging movements about a shaft 198 (Figs. 7 and 10) which is mounted to turn in an upstanding portion of a slide 200 guided by the slide 70 for movements in directions widthwise of the shoe (see also Fig. 9). These movements of the bar 74 and of the slide 200 are controlled as hereinafter described. Mounted in a recess in the outer end of the bar 74 and fastened to the shaft 198 to turn therewith is a cam member 202 having a cam face in engagement with the outer end of the slide 78 of the gripper. A spring 204 connected to this cam member and to a pin 206 on the slide 78 holds the slide retracted to provide the wire-receiving passage 84 between the jaws of the gripper when the parts are in their starting positions, as shown in Fig. 10. Formed on each shaft 198 is an arm 208 which, near the end of the upward swinging movement of the wiper carrier 14, is arranged to be engaged by a stop member 210 supported on a bar 212 which is secured to the frame of the machine (Figs. 2 and 10). By the action of this stop member on the arm 208 the shaft 198 is turned to cause the cam member 202 thereon to force the slide 78 inwardly and to grip the wire against the cooperating gripper jaw 76. After the wire has thus been gripped the stop member 210 may yield in an upward direction against the resistance of a spring 214 confined between it and a projection 216 on the bar 212, the stop member being slidable along a guideway in the bar.

Figure 22:
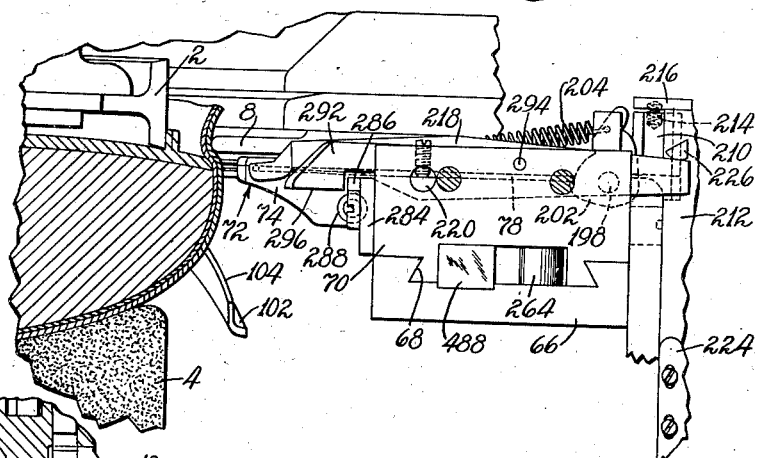
Fig. 22 is a view mainly in front elevation, showing the portion of the binder-applying means at the right-hand side of the shoe with the parts as they appear after the wire has been cut and when the wipers are beginning their movements to wipe the upper inwardly over the insole.

Also in response to the upward movement of the wiper carrier 14, substantially at the end of that movement, the portion of the wire fed into the wire guide 92 and into the grippers 72 to serve as a toe binder is severed from the rest of the wire by a cutter 218 the cutting edge of which is substantially contiguous to the front face of that portion of the right-hand gripper where the wire passage 84 is located. The cutter extends outwardly along the gripper bar 74 and is mounted to swing about a pin 220 (Fig. 7) secured by a screw 222 in the slide 70. When the parts are in their starting positions the outer end of the cutter rests on the top of a member 224 adjustably secured to the right-hand bar 212, as illustrated in Figs. 2 and 11. In this manner the portion of the cutter adjacent to the inner end of the gripper is held in position to permit feed of the wire into the passageway 84 in the gripper. When the wiper carrier has nearly completed its upward movement the outer end of the cutter is engaged above by a stop member 226 extending forwardly from the bar 212, thus causing the cutter to swing about the pin 220 and to cut the wire, as illustrated in Fig. 22. The severed toe binder is now gripped at both ends by the grippers 72.

Figure 23:
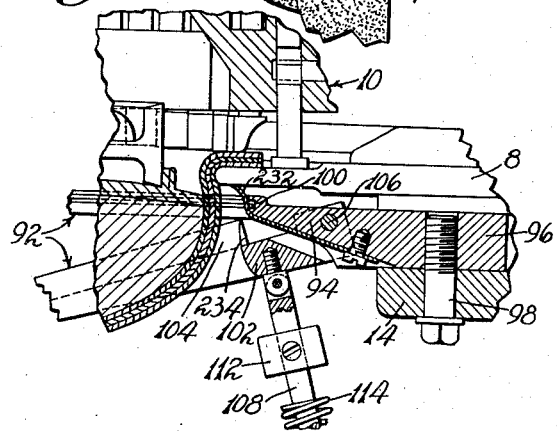
Fig. 23 is a vertical sectional view lengthwise of the shoe with the parts at the end of the toe in the same positions as in Fig. 22.

The upward movement of the wiper carrier also causes the member 102 of the wire guide 92 to be displaced about the pin 106 from in front of the wire guideway 100 in the member 94, as illustrated in Fig. 23. This results from engagement of a spring 228 (Fig. 4), which is supported on a collar 230 fast on the lower end of the rod 108, with the lower face of the bracket 110. It will be understood that the spring 114 by its expansion holds the member 102 in operative position until near the end of the upward movement of the wiper carrier, whereupon the engagement of the spring 228 with the bracket 110 stops further upward movement of the rod 108 and causes the member 102 to assume the position in which it is shown in Fig. 23 in response to the further upward movement of the carrier. Accidental displacement of the binder from the guideway 100 in the member 94 is, however, still prevented by a spring clip 232 which is fastened to the member 94 and extends upwardly in front of the guideway at the extreme end of the toe. The upwardly extending flange 104 of the member 102 is cut away to provide clearance for this spring clip, as shown at 234 in Fig. 23.

Figure 24:
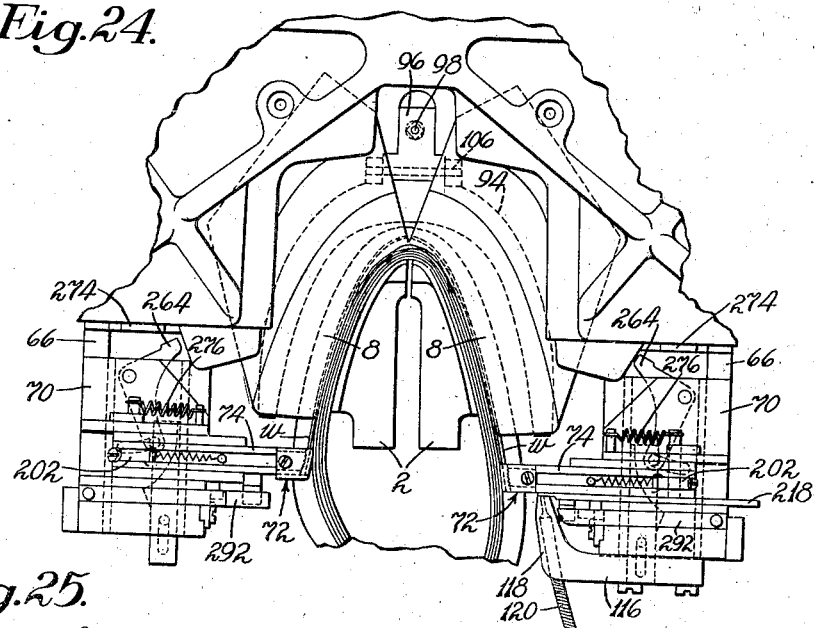
Fig. 24 is a plan view similar to Fig. 20, but showing the parts as they appear with the wipers at the limits of their first inward wiping movements and the binder pulled part way inward under the wipers.
Figure 27:
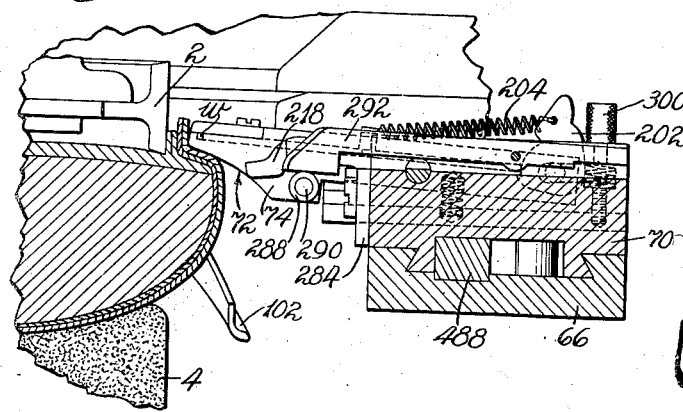
Fig. 27 is a view partly in front elevation and partly in section, showing the portion of the binder-applying means at the right-hand side of the shoe with the parts in the same positions as in Fig. 24.

In time relation to the advancing and closing movements of the wipers to wipe the marginal portion of the upper inwardly over the feather and against the lip of the insole the grippers 72 are moved forwardly lengthwise of the shoe to pull the binder inwardly under the wipers and against the upstanding margin of the upper and are also moved inwardly widthwise of the shoe to position the ends of the binder in the angle between the feather and the lip (Figs. 24 and 27). As the binder is thus pulled inwardly out of the guideway 100 in the wire guide 92 its intermediate portion is deflected upwardly by the spring clip 232 to a position in contact with the lower faces of the wipers, as will be evident by reference to Fig. 25 which shows the positions of the parts when the wipers are at the limits of their first inward wiping movements. The above-mentioned forward and inward movements of the grippers both result from forward movements of the slides 70 along their guideways on the supporting plates 66, the forward movements of the grippers being effected directly by these movements of the slides. Each slide is controlled by an arm 236 extending upwardly at the outer side thereof and provided at its upper end with a slot 238 (Fig. 3) in which lies the head of a screw 240 (Figs. 5 and 7) threaded in the slide. The two arms 236 are integral at their lower ends with a shaft 242 mounted in bearings formed in brackets 244 and 246 (Figs. 1 and 2) on the front of the frame, and fast on the left-hand end of the shaft is an arm 248 (Fig. 3) which extends rearwardly and carries a roll 250 lying in a cam track 252 formed in one side of a cam member 254 fast on the cam shaft 34. Connected to the arm 248 is a spring 256 the upper end of which is connected to a bolt 258 extending upwardly through a bracket 260 fast on the side of the frame. Threaded on the bolt is a wing nut 262 resting on the bracket for varying the tension of the spring 256. A portion f of the cam track 252 serves by its action on the arm 248 to compensate for that forward movement of the wiper carrier 14 which takes place prior to the wiping of the upper heightwise of the last, and another portion g of the cam track serves to compensate for the further forward movement of the wiper carrier to cause the wipers to wipe the upper inwardly over the insole. Beyond the portion g the cam track is widened at h to release the arm 248 to the action of the spring 256 and thus to cause the spring to move the slides 70 forward relatively to the wiper carrier, thereby operating the grippers 72 to pull the binder yieldingly inward under the wipers.

The inward movements of the grippers widthwise of the shoe to position the ends of the binder in proper relation to the shoe are effected simultaneously with their forward movements under control of bell-crank levers 264 (Figs. 5 and 7), one of which is mounted to swing about a vertical pin 266 on each of the slides 70 in a recess in the slide. One arm of each bell-crank lever carries a pin 268 extending upwardly through a curved slot 270 (Figs. 7 and 9) in the slide 70 into a transverse slot 272 formed in the grippercarrying slide 200. The other arm of the bellcrank lever 264 is engaged initially by a hardened wear plate 274 abutting against the front end of the wiper carrier 14 to hold the gripper 72 in its retracted position (Fig. 7). As the slide 70 is moved forwardly along the plate 66, carrying with it the bell-crank lever 264, the gripper 72 is moved inwardly toward the shoe, as permitted by the bell-crank lever, by means of a spring 276 connected at one end to a pin 278 on the slide 70 and at its other end to the previously mentioned shaft 198 mounted as described in the grippercarrying slide 200. A slot 280 (Fig. 9) in the slide 70, through which the shaft 198 extends, permits the gripper to be thus moved inwardly by the spring 276. The inward movement of the gripper is limited by its engagement with the shoe when it has positioned the end of the binder in the angle between the feather and the lip of the insole, as illustrated in Fig. 27. To permit the gripper thus to assume the proper position heightwise of the shoe it is mounted to swing about the shaft 198 as hereinbefore escribed. A spring 282 (Fig. 10) confined getween the gripper bar 74 and the slide 200 tends to swing the gripper upwardly about this shaft. Initially the gripper is held positively against the resistance of this spring in proper alinement with the guideway 190 in the wire guide 92 by means of a small block 284 which is secured to the inner side of the slide 70 and has thereon a projection 286 (Fig. 11) arranged to overlie and engage a roll 288 mounted on a pin 290 on the gripper bar 74. As the gripper starts to move inwardly the roll 288 is carried out from under the projection 286. Thereafter the gripper is yieldingly controlled with respect to movement heightwise of the shoe by a lever 292 which is mounted in a recess in the slide 70 to swing about a pin 294. The inner end portion of the lever 292 has a lower face 296 which is engaged by the roll 288 after the roll leaves the projection 286. Confined between the outer end portion of the lever 292 and the slide 70 is a spring 298 against the resistance of which the lever may swing in response to upward pressure of the roll 288 on its inner end portion. Cooperating with this spring to determine adjustably the normal position of the lever is the head of a screw 300, the screw extending through the lever and being threaded in the slide 70. The screw 300 is so adjusted that the inner end of the gripper first engages the upper in a location low enough to be deflected upwardly over the edge of the insole by contact of the upper therewith, the lever 292 swinging against the resistance of the spring 298 in response to the pressure of the roll 288 thereon. In this manner insurance is afforded that the gripper will assume the proper position heightwise of the shoe at the end of its inward movement, as shown in Fig. 27.

Figure 25:
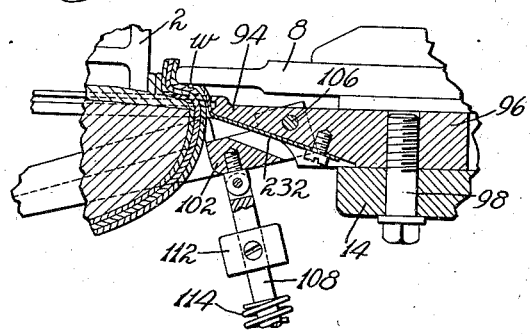
Fig. 25 is a vertical sectional view lengthwise of the shoe showing the parts at the end of the toe in the same positions as in Fig. 24.
Figure 26:
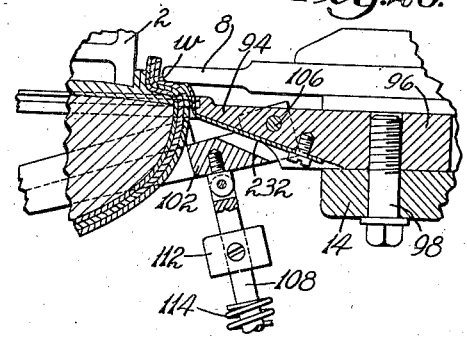
Fig. 26 is a view similar to Fig. 25, but showing the parts as they appear after the wipers have been partially retracted and again moved inwardly.

As illustrated in Fig. 25, which shows the parts as they are positioned when the wipers are at the limits of their first inward wiping movements over the shoe, the binder may first be pulled only part way inward under the wipers about the end of the toe by the action of the spring 256, the downward pressure of the wipers on the upper having been somewhat relieved to permit this to be done. When the wipers are partially retracted, as hereinbefore described, the binder is pulled farther inwardly against the upstanding margin of the upper, and when the wipers are again moved inwardly and forced downwardly they press the binder firmly against the upper, as illustrated in Fig. 26. The binder having thus been applied to the shoe and its opposite end portions having been positioned by the grippers 72 in the angle between the feather and the lip of the insole beyond the ends of the wipers, the cycle of operations is interrupted with the wipers applying their full pressure to the upper to permit the binder to be fastened to the shoe.

For fastening the binder to the shoe the machine is provided with a pair of fastening-inserting mechanisms, herein frequently referred to as stapling units, which are moved into proper relation to the shoe and are operated to form staples and to drive them over the binder, i. e., in positions to straddle the binder, and through the upstanding margin of the upper and the lip of the insole in locations beyond the forward ends of the wipers while the binder is held against the margin of the upper by the wipers. The two stapling units are positioned at the front of machine and are identical except for such differences as are necessitated by the fact that they operate respectively at opposite sides of the shoe. Each unit includes a main bar 302 (Figs. 18 and 19) arranged to extend generally widthwise of the shoe and provided near its outer end with a guideway 304 in which is mounted a crosshead 306 formed on one end of a shaft 308 which is mounted to turn in a bearing 310 secured to one side of the frame of the machine. The bar and the parts thereon may thus swing in directions heightwise of the shoe about the axis of the shaft 308 and may move relatively to the shaft in directions widthwise of the shoe. Slidingly mounted on the top of the bar 302 is a plate 312 (Figs. 13 and 17) which is confined on the bar by two screws 314 extending through slots 316 in the plate. Near its outer end the plate 312 has a downwardly extending arm 318 (Figs. 13 and 18) arranged to engage the bearing 310 and to be engaged on its outer side by the end of a screw 320 threaded in a member 322 which is secured to the lower face of the bar 302. Connected to the outer end of the bar and to the frame of the machine is a spring 324 which tends to move the bar lengthwise in an inward direction, its inward movement being adjustably limited by engagement of the screw 320 with the arm 318 of the plate 312. It will be understood that since the arm 318 is in engagement with the bearing 310 and since the plate 312 is slidingly mounted on the bar 302, turning of the screw 320 serves to adjust the bar relatively to the plate in directions widthwise of the shoe as may be required by shoes of different widths.

Slidingly mounted in a guideway 326 (Fig. 19) in the inner end portion of each bar 302 is a staple-guiding throat or nozzle 328 which includes a small block 330 and another member 332 secured to the block and extending outwardly along the bar 302 beyond the block. Secured to the member 332 in spaced relation to the block 330 is a member 334 which serves as an outside former and by moving inwardly toward the shoe with the throat 328 forms a staple over an inside former 336 extending through a slot 338 (Fig. 18) in the member 332. An enlarged portion of the inside former is slidingly mounted in an opening in one side of the bar 302 and in a cap member 340 secured to the side of the bar and extends into a slot 342 formed in one side of the member 332. A spring 344 presses the inside former inwardly as far as permitted by its engagement with the member 332. Mounted in the space between the block 330 and the outside former 334 is a small block 346 which is positioned opposite the inside former (Fig. 15) when the parts are in their initial positions and is provided with a slot into which the staple-forming portion of the inside former extends. A pair of springs 348 positioned between the block 346 and the member 332 tend to move the block in a direction away from the inside former and hold it initially in a slot 350 (Fig. 18) formed in a small plate 352 which by means of two screws 354 (Fig. 13) is secured to one side of the bar 302. With the block in this position a space is provided between it and the member 332 for the wire from which the staple is to be formed and for the bending of the legs of the staple about the inside former. In a manner hereinafter described the wire is fed into this space, between the outside former and one edge of the inside former, through a nipple 356 which is mounted in an opening in the bar 302. The length of wire required for the staple is severed from the rest of the wire, in response to movement of the throat 328 and the outside former inwardly toward the shoe, by a cutter 358 which is fastened to the top of the outside former and has a cutting edge substantially contiguous to the lower end of the nipple 356 when the parts are in starting positions. In response to the movement of the throat and the outside former, as soon as the staple is formed, the inside former is forced outwardly by engagement of the member 332 therewith at one end of the slot 342 in this member to provide a clear path for a staple driver 360 which moves in guideways formed in the members 330 and 334. Also in response to the same movement the block 346 is forced inwardly against the resistance of the springs 348 by engagement of the plate 352 therewith at one end of the slot 350 in the plate to close the space between the block and the member 332 and thus to assist in guiding the formed staple, the block being provided with a staple guideway arranged to aline with the guideways in the members 330 and 334.

Operative movement is imparted to the throat 328 and the outside former 334 through a toggle comprising a pair of links 362 and 364 which are connected together by a stud 366, the link 362 being connected to the throat and the outside former by a pin 368 carried by the members 332 and 334. As shown in Fig. 18, this pin has an opening through it for the passage of the driver 360. The link 364 is connected at its outer end to a stud 370 mounted in a block 372 which is slidingly movable along a guideway in the bar 302 and is controlled by a spring 374 mounted in a cap 376 secured on the outer end of the bar. This spring normally holds the block 372 in a position determined by its engagement with a shoulder 378 (Fig. 18) on the bar 302. The link 364 is mounted on an eccentric portion of the stud 370, and the stud may be turned in the block 372 for a purpose hereinafter explained. It is held in adjusted position by a nut 380 threaded on the portion thereof which extends through the block. The toggle 362, 364 is operated by fluid-pressure means comprising a piston 382 vertically movable in a cylinder 384 fast on the front of the frame (Fig. 2). The piston is connected to a projection on the toggle link 362 by a link 386 which is mounted at its upper end on a stud 388 in the piston and extends through a slot in the lower end portion of the piston. When fluid is admitted to the upper end of the cylinder 384 the piston 382 is moved downwardly against the resistance of a spring 390 connected to its lower end and starts to straighten the toggle 362, 364, thereby imparting inward movement to the throat 328 and the outside former 334. Almost immediately, however, the cutter 358 carried by the outside former engages the wire extending downwardly from the nipple 356, and the resistance of the wire prevents further straightening of the toggle. Continued movement of the piston, therefore, causes the bar 302 and the parts thereon to swing downwardly about the axis of the shaft 308, and in this manner a staple-clinching anvil 392 fast on the inner end of the bar is carried downwardly into engagement with the insole. The bar 302 is initially so adjusted by the screw 320 that when the anvil thus engages the insole it is positioned farther inwardly over the insole than the lip a. By reason of the resistance of the shoe to further downward swinging movement of the bar the toggle is then further straightened to cause the cutter to cut the wire and to cause the outside former to move inwardly and form a staple over the inside former. At the same time the throat 328 is moved inwardly toward the shoe until it engages the upper in the angle between the feather and the lip of the insole, as illustrated in Fig. 28, the end of the throat having therein a groove 394 (Fig. 19) in which the toe binder is located when the throat is at the limit of its inward movement. As the throat and the outside former are thus moved inwardly the bar 302 is moved in an outward direction against the resistance of the spring 324 to bring the anvil 392 against the inner face of the lip of the insole as shown in Fig. 28. For this purpose there is pivotally mounted on a member 396 (Fig. 13) fast on the frame a lever 398 the lower end of which is arranged to engage an upwardly extending arm 400 formed on the inner end of the plate 312. The upper end of the lever is connected by a link 402 to a pin 404 (Fig. 14) in the piston 382. The connection between the link and the lever comprises a pin 406 carried by the lever and extending through a slot 408 in the link, the pin being engaged by a spring 410 in the link. Accordingly, the link acts on the lever to move the bar 302 in an outward direction as above described through the plate 312 engaging the screw 320 on the bar, and after the anvil 392 engages the inner face of the lip of the insole the spring 410 yields to permit the link 402 to move relatively to the lever during further downward movement of the piston 382. As shown in Fig. 13, the lower end of the lever 398 is spaced initially from the plate 312 and its arm 409 to prevent the outward movement of the bar 302 until after the anvil 392 has substantially completed its downward movement. After the upstanding margin of the upper and the lip of the insole have been clamped between the throat 328 and the anvil 392, further straightening of the toggle 362, 364 serves to move the block 372 (Figs. 16 and 18) outwardly against the resistance of the spring 374. To limit the straightening of the toggle there is fast on the bar 302 a stop member 412 arranged to engage the link 364 of the toggle, as shown in Fig. 28.

In order that the staple when it is driven will straddle the binder, it is necessary that the portion of the binder engaged by the staple be located in proper relation to the staple guideway in the throat 328. To insure that this portion of the binder will not be too low relatively to the guideway, each stapling unit is provided with a finger 414 (Figs. 13 and 18) having on its inner end a lip 416 arranged to be moved inwardly over the upper on the feather of the insole and under the binder. Near its outer end this finger is supported on the pin 368 through which the throat and the outside former are operated, the finger being provided with a slot 418 through which the pin extends. Mounted in a socket in the finger is a spring 420 which bears at its outer end against a member 322 fastened to the pin 368. Near its inner end the finger is further supported by a pin 424 projecting from the throat member 330 into an angular slot 426 in the finger. Initially the finger is held retracted by the pins 368 and 424 to provide ample space between its lip 416 and the anvil 392. When the throat and the outside former are moved inwardly by the toggle acting on the pin 368, the pin acts through the spring 420 to move the finger 414 inwardly against the shoe. By reason of the resistance of the shoe thereafter to the movement of the finger the pin 424 moves relatively to it along the angular slot 426 as the throat 328 continues its inward movement, while the finger is pressed still farther inwardly by the spring 420. The lip 416 on the finger is therefore forced inwardly and upwardly over the upper on the feather of the insole to a position under the binder and raises that portion of the binder which is adjacent to the throat 328 into proper relation to the throat to receive the staple if it is not already in that relation.

Each staple driver 360 is fastened to a driver bar 428 which is movable along the previously mentioned guideway 304 in the bar 302. The driver is operated through a second toggle comprising a pair of links 430 and 432 connected together by a stud 434, the link 430 being connected to the driver bar 428 by a stud 436 which extends through a slot 438 (Figs. 18 and 19) in the bar 302. The link 432 is connected to the previously mentioned slidable block 372 by a stud 440. The toggle 430, 432 is operated by fluid-pressure means comprising a piston 442 (Fig. 2) movable in a cylinder 444 which is integral with the previously mentioned cylinder 384, the piston being connected by a link 446 to a projection on the toggle link 430. The piston is moved downwardly against the resistance of a spring 448 connected to its lower end. The fluid for operating the piston 442 is admitted to the cylinder 444 from the cylinder 384 through a port 450 when the piston 382 is moved downwardly from its starting position far enough to uncover this port. The piston 442 also extends upward initially beyond the port 450, and it is pulled downwardly against the resistance of the spring 448 to uncover this port by the previously described downward swinging movement of the bar 302, the bar acting on the piston through the toggle link 430 since the pin 436 connecting this link to the driver bar 428 is at that time at the outer end of the slot 438. It will be understood that by reason of the resistance of the spring 448 to the downward swinging movement of the bar 302 insurance is afforded that the cutter 358 will be forced against the wire as hereinbefore described through the toggle 362, 364 before the bar starts to swing downwardly. After communication is established between the cylinders 384 and 444 through the port 450 it is still necessary to prevent the driver from driving the staple until the toggle 362, 364 has been substantially straightened to complete the forming of the staple and the inward movement of the throat 328. Temporarily, therefore, the straightening of the toggle 430, 432 is prevented even after the fluid is admitted to the cylinder 444. For this purpose there is pivotally mounted on a stud 454 on the bar 302 a stop member 456 one end of which is arranged to lie in the path of movement of the stud 436 and to engage that portion of the link 430 which is mounted on the stud. A spring 458 mounted in a holder 460 which is fastened on a small cover plate 462 on the front of the bar 302 engages a tail 464 on the stop member 456 to hold the member in that position. When the toggle link 362 nears the limit of its movement a small block 466 carried by the link engages the stop member 456 and swings it downwardly against the resistance of the spring 458 out of the path of movement of the stud 436 and the link 430 (Fig. 28). This serves to release the driver-operating toggle to cause the driver to be operated by the fluid in the cylinder 444. The movement of the driver-operating toggle is limited by engagement of its link 430 with the stop member 412, as shown in Fig. 30.

Reference has been made to the fact that after the upstanding margin of the upper and the lip of the insole have been clamped between the throat 328 and the anvil 392, any further straightening of the throat-operating toggle, until its movement is stopped by the member 412, serves to move the block 372 (Fig. 18) outwardly against the resistance of the spring 374. This block, therefore, assumes a position depending upon the position assumed by the throat in accordance with the thickness of the shoe materials between the throat and the anvil, and since the link 432 of the driver-operating toggle also is connected to the block 372, this toggle is adjusted by the throat-operating toggle to determine the limit of the operative movement of the driver in accordance with the position of the throat. The staple-engaging end of the driver will, therefore, be located in a definitely predetermined relation to the throat 328 when the driver is at the end of its staple-driving movement. Insurance is thus afforded that the driver will not drive the staple too far with a possible tendency to cut the binder wire. By adjustment of the eccentric stud 370 (Fig. 18) the relation between the throat and the driver when these parts are at the limits of their operative movements may be varied to vary the distance that the staple is driven into the work. As shown in Fig. 31, the staple is preferably driven far enough to cause its crossbar to bend inwardly to some extent the portion of the binder which it engages, so that the binder will be held tight against the upstanding margin of the upper about the end of the toe. The anvil 392 has therein a clinching cavity 468 (Fig. 18) so arranged relatively to the driver as to deflect the staple legs in directions toward the heel end of the shoe and outwardly into the lip of the insole, as illustrated in Fig. 31. Because the legs are deflected or clinched in these directions any pull of the binder on the crossbar of the staple in a direction toward the end of the toe has no tendency to loosen the staple, but rather tends to increase the pressure of the crossbar on the binder.

Simultaneously with the driving of the staples to fasten the binder to the shoe the grippers 72 are opened to cause them to release the ends of the binder. For this purpose there is slidingly mounted on the front of the link 362 of each throat-operating toggle a plate 470 (Fig. 13) which partially embraces the link and to which the previously mentioned small block 466 at the rear of the link is secured by a screw 472 extending through a slot 474 in the link. Pivotally mounted on a pin 476 on the plate 470 is an arm 478, and extending from a pin on this arm to a pin on the end of the previously mentioned stud 370 is a spring 480 which holds the arm normally in a position determined by engagement of a tail portion 482 thereof with a lug on the plate 470 and also holds this plate normally with the screw 472 at one end of the slot 474. When the driver-operating toggle 430, 432 is operated one end of its link 430 engages the small block 466 and moves the slide 470 inwardly toward the shoe along the link 362. In this manner the inner end of the arm 478 is moved into engagement with an upstanding finger 484 (Fig. 28) formed on the cam member 202 which controls the sliding jaw 78 of the gripper 72 at that side of the shoe and turns the cam member into position to permit the spring 204 to retract the jaw and release the binder, as illustrated in Fig. 30. The pivotal mounting of the arm 478 on the plate 470 permits the arm to ride upwardly over the finger 484.

When the grippers 72 release the binder as above described, the spring 256 (Fig. 3) acts on the arm 248 to swing the two arms 236 farther forwardly, as permitted by the fact that the roll 250 on the arm 248 is at that time in the widened portion of the cam track 252. In this manner gripper-supporting slides 70 may be moved far enough forwardly to carry the grippers beyond the ends of the binder. To insure this result the cam track 252 has an outward bend $i$ which acts on the arm 248 when the cam shaft 34 is again started. In response to the forward movements of the slides 70 the grippers are also retracted from the shoe widthwise thereof. For this purpose there is mounted in a guideway 486 (Fig. 9) in each of the supporting plates 66, within that recess in the slide 70 in which the bell-crank lever 264 is located, a slide 488 movable along the guideway in directions lengthwise of the shoe between limits determined by a pin 490 in the plate 66 and a slot 492 in the slide 488 into which the pin extends. Formed on this slide is a cam face 494 (Fig. 12) which by engagement with the front end of the bell-crank lever 264 serves to swing this lever and thereby to move the gripper-carrying slide 200 outwardly to withdraw the gripper from the shoe in response to the forward movement of the slide 70, forward movement of the slide 488 being stopped by the pin 490. The front end of the bell-crank lever is carried beyond the cam face 494 to a position where one side of the lever is in engagement with a projection 496 on the slide 488, as shown in Fig. 12. When the slides 70 are moved rearwardly by the cam track 252 in the return of the parts to starting positions, the frictional engagement of each bell-crank lever 264 with the projection 496 on the adjacent slide 488 causes this slide to move with the slide 70 until it is stopped by the pin 490. In this manner each gripper is held retracted from the shoe to avoid contact therewith as it is returned to starting position. Before the slides 70 complete their return movements the front ends of the bell-crank levers 264 are carried beyond the projections 496 by reason of the limitation of the movements of the slides 488, but by that time the bell-crank levers have been carried far enough rearwardly to be controlled by the abutment plates 274, so that the grippers are still held in their retracted positions.

The wire W from which the staples are formed is supplied from a pair of reels 498 (Fig. 2) rotatably mounted on brackets 500 which are secured to the front of the frame and passes over yieldingly supported idler pulleys 502 and thence downwardly to the respective stapling units. Each strand of wire extends downwardly through a guide 504 fast on the front of the frame, and pivotally mounted on this guide is a bell-crank lever 506 (Fig. 29) one arm of which is arranged to engage the wire and to serve as a brake to prevent reverse upward movement of the wire while permitting it to be moved freely downward. A spring 508 acts on the other arm of the bell-crank lever to hold the first-mentioned arm in frictional engagement with the wire. Below the brake the wire extends through a flexible tube 510 which may be a coil spring and the lower end of which extends into the previously mentioned nipple 356 and is held therein by a screw 512 (Fig. 15). The upper end portion of the flexible tube is mounted to slide freely in upward and downward directions in a guide 514 fast on the frame. As already explained, the first action of each toggle 362, 364 in response to the admission of fluid to the cylinder 384 is to move the knife 358 into engagement with the wire adjacent to the lower end of the nipple 356, after which the bar 302 is swung downwardly to carry the anvil 392 into engagement with the insole before the wire is cut by further straightening of the toggle. This downward swinging movement of the bar, by reason of the engagement of the knife with the wire, serves to feed the wire for forming the staple to be used in the next shoe. It will be understood that after the binder has been fastened to the shoe each stapling unit is swung upwardly by the springs 390 and 448 by reason of the release of the fluid in the cylinders 384 and 444, and since the wire is prevented from moving upwardly by the brake 506, the upward movement of the unit causes the wire to enter the space between the outside former 334 and the inside former 336 until its lower end engages the lower wall of the guideway 326 (Fig. 19) in the bar 302. In this operation the flexible tube 510 slides upwardly in the guide 514. The end of the staple wire thus serves as a stop to limit the upward swinging movement of the stapling unit, and insurance is thereby afforded that the proper amount of wire to form the staple is fed to the unit. It will be evident, however, that the wire cannot enter the space between the inside former and the outside former until after the staple driver and the outside former have been retracted by their operating toggles upon release of the fluid from the cylinders 384 and 444. The engagement of the end of the wire with the top of the knife 358 or with the top of the outside former 334 prevents the upward swinging movement of the unit until the driver and the outside former have been thus retracted.

The fluid, preferably oil, for operating the stapling units is supplied by a continuously driven pump 516 (Fig. 1) which receives oil from a reservoir 518 at the base of the machine and delivers it through a coupling 520 and a pipe 522 to a port 524 (Figs. 3 and 3a) in a valve casing 526 fast on the frame. A spring-controlled relief valve 528 on the coupling 520 determines the maximum pressure of the oil delivered by the pump and permits return of any surplus oil to the reservoir when that pressure has been attained. Connected to ports 530 and 532 in the valve casing are pipe lines 534 and 536 which lead respectively to the upper ends of the cylinders 384 and 444. Between the pipe line 536 and each cylinder 444 is a check valve 538 which is normally closed to prevent the piston 442 from being operated by any fluid except that delivered from the cylinder 384 through the port 450 when this port is uncovered. The purpose of the check valve 538 is to permit exhaust of fluid from the upper end of the cylinder 444 beyond the port 450 in the return of the parts to starting positions. Within the valve casing 526 is a rotary valve 540 having therein two recesses 542 and 544 and having also a peripheral passageway 546 extending part way around it and communicating with the recess 542. When the valve is in its initial position, as shown by dotted lines in Fig. 3, the port 524 which receives oil from the pump communicates through the recess 542 and the passageway 546 in the valve with a port 548 (Fig. 3a) through which the oil is conducted to a pipe 550. This pipe preferably leads to such portions of the machine as require lubrication. When the valve is in its initial position also the ports 530 and 532 are in communication through the recess 544 in the valve with a port 552 and a pipe 554 leading back to the reservoir 518, so that the cylinders 384 and 444 are open to exhaust. When the valve is turned to the position in which it is shown in Fig. 3a the port 524 is in communication with the ports 530 and 532, and accordingly oil is delivered from the pump to the pipe lines 534 and 536, the stapling units being operated by the oil from the pipe line 534 and the check valves 538 being held closed by the oil in the pipe line 536.

Fastened to a stem 556 (Fig. 3) on one end of the valve 540 is an arm 558, and connected to this arm is a spring 560 which holds the valve normally in the position of Fig. 3 with the cylinders 384 and 444 open to exhaust, this position of the valve being determined by a pin 562 (Figs. 1 and 3a) in engagement with a shoulder on a flange 564 formed on one end of the valve outside of the casing 526. Also fast on the stem 556 is an arm 566 to which is pivotally connected an upwardly extending link 568. Near its upper end this link is provided with a slot 570 through which extends a screw 572 threaded in an arm 574 pivotally mounted on a stud 576 on the frame. The previously mentioned cam member 254 carries a pin 578 which engages the inner end of the arm 574 shortly before the pause in the cycle of operations and by downward swinging movement of the arm turns the valve 540 into the position to admit the operating fluid to the pipe lines 534 and 536, the screw 572 acting on the link 568 at the lower end of the slot 570. Before the pause in the cycle the pin 578 passes beyond the arm 574, and in order to hold the valve against return movement there is provided a latch 580 arranged to engage the arm 558 in a notch 582 (Fig. 3) formed in the arm. A spring 584 acts on a tail portion 586 of the latch to cause the latter to enter the notch 582. After the driving of the staples the valve 540 is returned to its initial position by the spring 560 to release the fluid from the cylinders 384 and 444. To release the valve to the action of the spring there is provided fluid-operated means for withdrawing the latch 580 from the notch 582. This means comprises a piston 588 movable in a cylinder 590 against the resistance of a spring 592 and provided with a rod 594 arranged to engage the tail portion 586 of the latch. Fluid is admitted to the cylinder 590 to operate the piston 588 through a pipe 596 leading from the port 532 which communicates with the pipe line 536. The spring 592 is of such strength that the piston 588 is operated only in response to such increase of pressure in the pipe lines 534 and 536 as occurs after the staples have been driven and the pistons 442 have become stationary.

It may sometimes be desired to run the machine without operating the stapling units to assist the operator, for example, in adjusting the machine for use on shoes of a different style from those on which the machine has previously operated. To permit this to be done there is pivotally connected to the arm 574 an upwardly extending link 598 which is guided at its upper end by a stud 600 on the frame extending through a slot 602 in the link. Also guided for horizontal movements by studs 604 on the frame is a bar 606 having slots 608 through which the studs extend and provided at its front end with a handle 610. On its rear end the bar 606 has an inclined face 612 arranged to engage a pin 614 on the link 598 and to raise the link in response to rearward movement of the bar. In this manner the arm 574 is swung upwardly to such a position that it will not be engaged by the pin 578 on the cam member 254 and accordingly the stapling units will remain idle during the pause in the cycle of operations of the machine when the staples would be driven if the units were operated.

The machine is further provided with means whereby, for test purposes, the stapling units may be caused to operate independently of any cycle of operations of the machine. This means comprises a rod 616 (Figs. 1 and 3) pivotally connected at its rear end to the arm 558 which is fast on the valve 540 and connected at its front end to the lower end of a hand lever 618 pivotally mounted on the frame. By movement of this hand lever the valve 540 may be turned to the position in which it is held by the latch 580, whereupon the stapling units will perform their characteristic operations and will thereafter return to their starting positions in response to automatic release of the valve by the latch 580. If the units are thus operated without any shoe in the machine their downward swinging movements are limited by engagement of their bars 392 with stops 620 (Fig. 2) on the frame.

Figure 1:
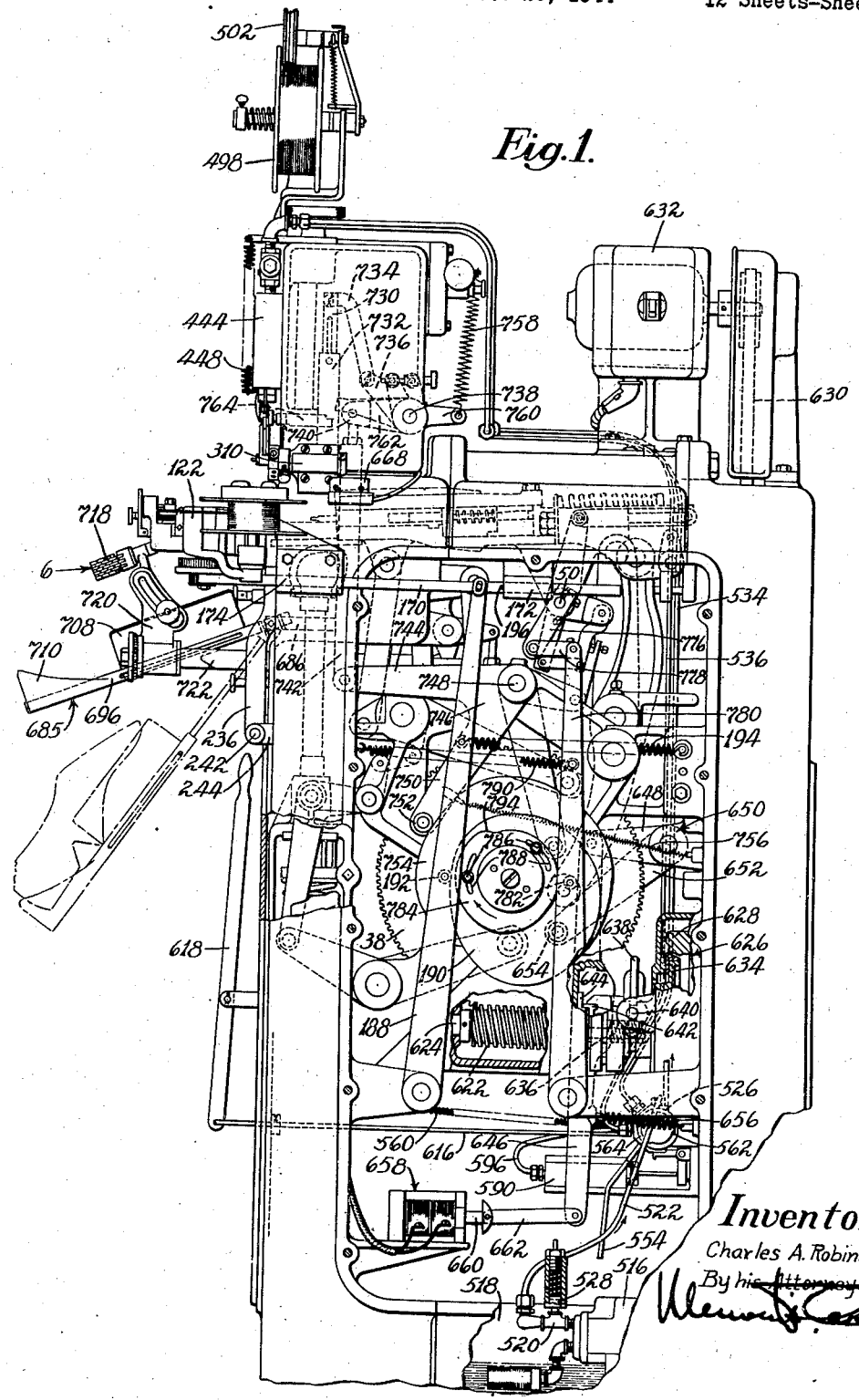
Fig. 1 is a view in right-hand side elevation of the machine to which the invention is herein shown as applied.

It will be understood that what is herein referred to as the cycle of operations of the machine corresponds to one complete rotation of the cam shaft 34. For rotating this cam shaft the previously mentioned gear wheel 38 thereon is engaged and operated by a worm 622 (Fig. 1) fast on a shaft 624 on which is a clutch 626. Since this clutch and the means for controlling it are in many respects the same as disclosed in the previously mentioned Letters Patent No. 2,160,846, such parts as are common to the prior disclosure will be herein only briefly described. The clutch includes a member 628 driven through a belt 630 by an electric motor 632 and mounted to turn about the shaft 624, and a cooperating clutch member 634 mounted to turn with the shaft 624 and movable also lengthwise of the shaft. A spring 636 mounted within the hub portion of the member 634 tends to move this member into frictional engagement with the member 628 to cause the shaft 624 to be driven. The member 634 is, however, held initially out of engagement with the member 628 by a yoke 638 which is mounted to turn about the axis of a shaft 640 and is connected to the hub of the member 634. The yoke 638 carries a latch 642 normally engaged underneath by a block 644 mounted on an arm 646 which is pivotally supported at its upper end on one arm 648 of a bell-crank lever 650 on the frame, the other arm 652 of this bell-crank lever having thereon a roll 654 engaged by a cam (not herein shown) on the cam shaft 34. A spring 656 connected to the arm 646 tends to swing the arm rearwardly, i. e., toward the right in Fig. 1, about its connection with the arm 648 of the bell-crank lever. As the parts are shown in Fig. 1, the latch 642 is uplifted by the block 644 and the clutch member 634 is thereby held out of engagement with the member 628. The machine is started by swinging the arm 646 forwardly against the resistance of the spring 656 to release the latch 642, thus permitting the spring 636 to effect engagement of the clutch members. To interrupt the cycle of operations and to stop the machine at the end of the cycle, the arm 646 is moved downwardly and upwardly by the cam which controls the bell-crank lever 650, thus causing the block 644 again to assume an operative relation to the latch 642 and to lift the latch. As thus far described the clutch-controlling mechanism may be regarded as of the same construction as disclosed in Letters Patent No. 2,160,846.

Instead of being operated by a treadle to start the machine, as disclosed in the above-mentioned Letters Patent, the arm 646 in the construction herein shown is operated by electrical means including a solenoid 658 having an armature 660 connected by a link 662 to the lower end of the arm. This solenoid is energized initially to start the machine by a switch 664 (Fig. 32) which is closed by a push button 666 (Fig. 2) at the front of the machine. The actuation of the clutch the second time, after the pause in the cycle to permit the fastening of the binder by the staples, is effected by the upward swinging movements of the stapling units in their return to starting positions. For this purpose there is associated with each stapling unit a switch 668 (Figs. 2, 3 and 32) which is closed by the upward swinging movement of the unit near the end of that movement. To close each of these switches there is fast on the shaft 308 (Fig. 18) of the corresponding stapling unit an arm 670 having therein a spring-pressed plunger 672 (Fig. 13) arranged to act on the switch at the proper time, this plunger being yieldable to permit the unit always to be swung upwardly until stopped by the staple wire as hereinbefore described. Such actuation of the clutch by the return of the stapling units insures that both units will have been returned substantially to their initial positions before the machine resumes its cycle of operations, as a safeguard against possible breakage of parts. If either unit should fail to move upwardly far enough to actuate the clutch, it is only necessary for the operator to move it farther upwardly by hand until the switch associated therewith is closed. In the circuit controlled by the two switches 668 there is another switch 674 (Figs. 3 and 32) which is closed by a peripheral cam 676 formed on the cam member 254 just before the pause in the cycle to permit the operation of the stapling units, this cam acting on the switch through a pivoted arm 678. It will be understood that upon resumption of the cycle after the driving of the staples the switch 674 is immediately opened by reason of the release of the arm 678 by the cam 676, so that the arm 646 will be in position to disengage the clutch and bring the machine to a stop at the end of the cycle, notwithstanding the fact that the two switches 668 are held closed by the stapling units. In the same circuit as the switches 668 and 674 is still another switch 680 having an arm 682 (Fig. 3) arranged to be engaged by a pin 684 on the previously mentioned bar 606 to keep the circuit broken regardless of the closing of the switch 674 by the cam 676 when the bar is in position to prevent the operation of the stapling units. From Fig. 32 it will be evident that notwithstanding the fact that the switch 674 is normally open, the solenoid may be energized to start the machine by the push button 666.

In the machine to which the invention is herein shown as applied the shoe is released after the lasting operation by retractive movements of the toe rest 4 and the heel rest 6, and it has been necessary heretofore for the operator to hold the shoe as it is thus released and to dispose of it before presenting another shoe to the machine. To increase the output of the machine the construction herein shown further includes a shoe receiver 685 (Figs. 1, 2 and 5) which receives the shoe when it is released by the toe rest and the heel rest and supports it until after the machine has started to operate on another shoe, so that the operator may have another shoe ready to present to the machine as soon as it completes its cycle. Secured on the frame adjacent to the toe rest 4 is a plate 686 having therein a pin 688 on which is pivotally mounted another plate 690. Secured to the plate 690 by screws 692 are two rods 694 extending forwardly and downwardly therefrom, and telescopically mounted on these rods to slide thereon are tubular members 696 connected together at their front ends by a plate 698. Mounted within one of the rods 694, which is hollow, is a tension spring 700 connected at its rear end to the plate 690 and at its front end to a pin 702 in the corresponding tubular member 696. By the spring 700, therefore, the two members 696 are held normally in rearwardly retracted positions determined by engagement of a pin 704 mounted in one of the rods 694 with the corresponding member 696 at the front end of a slot 706 in this member. Fast on the members 696 are wings 708 which diverge from each other to receive a shoe between them, and also fast thereon is a stirrup-shaped member 710 arranged to embrace the heel end of the shoe. Connected to a pin on the top of the plate 690 is a spring 712 which tends to swing this plate about the pin 688 in the direction to raise the shoe-supporting members which are secured to the plate and holds them initially in the upraised positions in which they are shown in full lines in Fig. 1, the limit of the movement of the members in this direction being determined by engagement of a screw 714 in the plate 690 with a portion of the frame. When the shoe is released by the toe rest and the heel rest it falls into the pocket provided by the wings 708 and the stirrup member 710, and the weight of the shoe causes the plate 690 and the parts thereon to swing downwardly against the resistance of the spring 712 to an inclined position determined by engagement of another screw 716 in the plate with a portion of the frame. The weight of the shoe also causes the tubular members 696 to slide forwardly and downwardly against the resistance of the spring 700. If the weight of the shoe is sufficient this movement of the members 696 may continue until stopped by the pin 704 at the rear end of the slot 706. The shoe will thus assume a position such as indicated by broken lines in Fig. 1, where it is well out of the way of the next shoe when the latter is presented to the machine. The operator will have the next shoe in his hands ready to present it as soon as the machine completes its cycle, and after presenting it and starting the machine he will remove from the shoe receiver the shoe already operated upon. Novel features of this shoe receiver are claimed in Letters Patent No. 2,409,643, granted October 22, 1946, on a divisional appplication of mine.

To provide room for the shoe receiver the heel-rest mechanism shown in Letters Patent No. 2,160,846 is somewhat modified in construction. The heel rest comprises, as heretofore, a flexible band 718 connected at its opposite ends to arms 720 which are mounted to swing toward or from each other on rods 722 one of which is shown in Fig. 1. The arms are swung yieldingly apart by springs 724 (Fig. 2) connected to caps 726 fast on the ends of the rods and to flanges 728 on the arms. In the construction herein shown, in order to provide room for the shoe receiver, the caps 726 and the flanges 728 are substantially semi-circular instead of circular as heretofore, and the springs 724 are tension springs extending only part way around the axes of the rods instead of springs of the form shown in the above-mentioned Letters Patent.

As shown and described in detail in the previously mentioned Letters Patent No. 2,397,624, the retarder 18 (Figs. 20 and 23) which clamps the marginal portion of the upper outspread on the wipers is supported on the lower end of a bar 730 (Fig. 1) which is vertically movable in a guide 732 and is connected by a link 734 to an arm 736 connected to a rockshaft 738, so that by turning of the rockshaft in one direction the retarder is moved downwardly to clamp the upper on the wipers and by reverse movement of the rockshaft the retarder is moved upwardly away from the wipers. Fast on one end of the rockshaft is an arm 740 connected by a link 742 to one arm 744 of a bell-crank lever 746 mounted to turn about a shaft 748. The other arm 750 of this bell-crank lever carries a roll 752 in engagement with the periphery of a cam 754 fast on the cam shaft 34. A spring 756 connected to the arm 750 holds the roll 752 normally against the cam 754. When permitted by the rotation of the cam the spring 756, in cooperation with another adjustable spring 758 connected to an arm 760 on the rockshaft 738, turns the rockshaft to impart downward movement to the bar 730 and thus to move the retarder into position to clamp the upper on the wipers, where it is yieldingly held thereafter by the two springs until after the wipers have begun to wipe the margin of the upper inwardly over the insole. At this time the cam 754 becomes effective to turn the rockshaft 738 in the reverse direction and thereby to withdraw the retarder from the upper.

If it should happen, in the use of the machine herein shown, that the binder applied about the toe end of the upper is not properly fastened to the shoe, conditions may require that the binder be removed and that the shoe be operated upon a second time by the machine. In that case it is desirable to prevent the operation of the retarder, since the upper, having already been wiped inwardly over the insole, tends to retain the shape imparted to it. There is accordingly secured on the rockshaft 738 another arm 762, and slidingly mounted in the frame is a bar 764 (Figs. 1 and 2) which may be moved rearwardly by the operator into position to engage the arm 762 and to act as a stop to prevent the downward movement of the retarder to upper-clamping position.

In the machine to which the invention is herein shown as applied, as heretofore constructed, the wipers are closed to positions for wiping the upper heightwise of the last in an invariable time relation to their movements heightwise of the last. Accordingly, the positions of the edges of the wipers when they first become effective to wipe the upper heightwise of the last may depend upon the style of the shoe. That is, in operating, for example, on a shoe having a comparatively high toe the wipers may not be closed inwardly to any substantial extent beyond the widest portion of the toe, while in operating on a shoe having a comparatively low or receding toe they may be closed more or less inwardly under the sides of the toe before they become effective to wipe the upper upwardly. In the latter case, the wipers are thereafter necessarily forced apart against the resistance of the springs 46 (Figs. 4 and 5) by the wedging action of the shoe thereon as they are moved farther upwardly. To avoid any possible danger of excessive pressure of the edges of the wipers on the upper under those conditions, the construction herein shown is such that the time when the wipers by their closing movements arrive in positions for wiping the upper heightwise of the last may be varied. To this end, the closing of the wipers to those positions is effected, not alone by the cam track 54 (Fig. 4), but by other means which supplements the action of the cam track 54 and operates in an adjustably variable time relation to this cam track. The previously mentioned means 64 connecting the wiper-closing bell-crank lever 48 to the arm 62 which operates it comprises a pair of toggle links 766 and 768 pivotally connected respectively to the bell-crank lever and to the arm and connected together by a pin 770. This pin is connected by a link 772 to an arm 774 which is fast on the previously mentioned shaft 50 on which the bell-crank lever 48 is loosely mounted, and also fast on this shaft is an arm 776 (Fig. 1) connected by a link 778 to the upper end of an arm 780 which is pivotally mounted at its lower end on a bracket on the frame. Mounted on the arm 780 is a roll 782 arranged to be engaged by the periphery of a cam 784 secured on one side of the previously mentioned cam 190 by screws 786 extending through slots 788 in the cam 784. A spring 790 connected to the arm 780 tends to swing the arm toward the left, as the parts are viewed in Fig. 1, and thereby tends to turn the shaft 50 in a clockwise direction. A screw 792 (Fig. 4) which is threaded in an upwardly extending lug on the upper end of the link 768 and engages a lug on the side of the link 766 limits the turning of the shaft 50 under the influence of the spring 790 and adjustably determines the normal positions of the toggle links with the toggle broken toward the left as the parts are viewed in Fig. 4. At a time in the cycle of operations which may be varied by adjustment of the cam 784 in the manner permitted by its screw-and-slot connection with the cam 190 a rise 794 on the cam 784 engages the roll 782 and through the mechanism described straightens the toggle 766, 768, thereby imparting further closing movements to the wipers supplementary to the closing movements effected by the portion b of the cam track 54. In this manner the wipers are closed to positions for the wiping of the upper heightwise of the last. It will be understood that in operating on shoes having comparatively high toes the cam 784 will be so adjusted as to advance the time of the straightening of the toggle, and that in operating on shoes having comparatively low or receding toes the cam will be adjusted to delay the straightening of the toggle, so that the wipers will not be closed inwardly under the sides of the toe in such manner as to cause them thereafter to be wedged apart to any substantial extent by the action of the shoe thereon. It will further be understood that adjustment of the screw 792 will serve to vary the initial positions of the wipers widthwise of the shoe and correspondingly to vary the amount of movement imparted to the wipers by the cam 784 by varying the position of the roll 782 relatively to the cam. Novel features of this wiper-operating mechanism are claimed in Letters Patent No. 2,409,642, granted October 22, 1946, on an application of mine.

The manner of operation of the machine will now be briefly summarized. The operator presents a shoe in the position determined by engagement of the plates 2 with the toe end of the insole, and then starts the cycle of operations by pressing on the push button 666. Movement of the push button closes the electrical circuit through the solenoid 658 and causes the solenoid to actuate the clutch. Substantially at the beginning of the cycle the toe rest 4 is moved upwardly and clamps the shoe against the plates 2, and early in the cycle also the heel rest 6 is moved rearwardly into engagement with the shoe. After the shoe has been clamped, the wipers 8 are advanced and closed to bring their wiping edges into positions for wiping the upper heightwise of the last and are swung upwardly by the wiper carrier 14 to cause them thus to act on the upper. Such closing of the wipers preparatory to the upwipe results not only from the action of the cam track 54 (Fig. 4), but also from the straightening of the toggle 766, 768 by the adjustable cam 784 (Fig. 1), this cam being so adjusted in view of the style of the shoe operated upon as to prevent the wipers from closing too far inwardly before they begin their effective upwiping action on the upper. By the time the wipers thus begin to wipe the upper upwardly its marginal portion is clamped in outspread position thereon by the retarder 10 (Fig. 20) which is moved downwardly into upper-clamping position and is thereafter lifted by the wipers in their upward movements. After the upward movements of the wipers they are further advanced and closed to wipe the marginal portion of the upper inwardly over the feather and against the lip of the insole, the retarder being moved upwardly to release the upper early in this operation. The wipers are then partially retracted and opened, their downward pressure on the upper being somewhat relieved, after which they are again moved inwardly to their fully advanced and closed positions and are moved downwardly to increase their pressure on the upper. At this point the cycle of operations is automatically interrupted by the cam-operated means provided for controlling the clutch.

Early in the above-described portion of the cycle of operations the wire-feeding mechanism which is operated by the cam 190 (Fig. 1) feeds binder wire through the right-hand gripper 72, along the wire guide 92 and into the left-hand gripper where the end of the wire engages the wall 88 (Fig. 21) of that gripper to stop its feeding movement. Since the two grippers 72 and the wire guide 92 are supported by the wiper carrier 14, they are moved upwardly with the wipers in the wiping of the upper heightwise of the last. In response to the upward movement of the wiper carrier, near the end of that movement, the cam members 202 (Fig. 10) are turned by the action of the stop members 210 on the arms 208 to close the grippers on the wire, the cutter 218 is operated (Fig. 22) by the stop member 226 to cut the wire just in front of the right-hand gripper, and the member 102 of the wire guide 92 is caused to open the guide on the side toward the shoe (Fig. 23) through the action of the stationary bracket 110 (Fig. 4) on the rod 108. Thereafter, in time relation to the movements of the wipers to wipe the marginal portion of the upper inwardly over the insole, the grippers 72 are moved forwardly lengthwise of the shoe to pull the binder inwardly under the wipers, the grippers being thus operated by the spring 256 (Fig. 3) which acts on the cam-controlled arms 236 connected to the gripper-carrying slides 70. As the binder is thus pulled out of the wire guide 92 the portion thereof at the extreme end of the toe is deflected upwardly to a position contiguous to the lower faces of the wipers by the spring clip 232 (Fig. 23) attached to the guide, so that the binder will be drawn inwardly between the wipers and the portion of the upper overlying the feather of the insole. In the course of their forward movements the grippers are also moved inwardly widthwise of the shoe to position the ends of the binder in the angle between the feather and the lip of the insole (Figs. 24 and 27), these movements of the grippers being effected by the springs 276 (Fig. 7) controlled by the bell-crank levers 264 which are released by the forward movements of the slides 70. As the grippers are thus moved inwardly their positions heightwise of the shoe are adjustably determined by the levers 292 which are engaged underneath by the rolls 288 on the grippers and are upwardly yieldable to permit the grippers to be deflected upwardly into the angle between the feather and the lip of the insole by contact of the upper therewith. As shown in Fig. 25, the binder may first be pulled only part way inward under the wipers when the wipers are at the limits of their first inward wiping movements and their downward pressure on the upper has been somewhat relieved. When the wipers are thereafter partially retracted the binder is pulled farther inwardly against the upstanding margin of the upper opposite the lip of the insole by the action of the spring 256 on the grippers, and when the wipers are again moved inwardly and are forced downwardly they press the binder firmly against the upper (Fig. 26). The cycle of operations being interrupted at this point, the binder is held throughout most of its length in proper relation to the upper by the wipers, its end portions being still controlled by the grippers which are spaced somewhat forwardly of the ends of the wipers.

Just before the cycle is interrupted as above described, the pin 578 (Fig. 3) acts on the arm 574 to turn the valve 540 into position to admit operating fluid to the two cylinders 384 (Fig. 2), the valve being retained in this position by the latch 580. The first effect of the fluid admitted to these cylinders, acting through the pistons 382 on the toggles 362, 364, of the stapling units, is to advance the outside formers 334 (Fig. 19) and their cutters 358 far enough to engage the cutters lightly with the staple-forming wire extending downwardly into the units, downward swinging movements of the units about the axes of the shafts 308 being yieldingly resisted by the springs 448. These springs are, however, weak enough to permit the units thereafter to be swung downwardly by further movements of the pistons 382 while further operative movements of the outside formers and the cutters are prevented by the resistance of the wire, the cutters therefore acting to feed portions of the wire downwardly past the brakes 506 which thereafter prevent reverse movement of the wire. In this manner the anvils 392 of the stapling units are carried downwardly into engagement with the insole in locations farther inwardly than its lip to position the units in proper relation to the shoe. By reason of the resistance of the shoe to further downward movements of the units the toggles are then further straightened to cut the wire and to cause the outside formers to form staples over the inside formers, the throats 328 being moved inwardly into engagement with the upper in the angle between the feather and the lip of the insole (Fig. 28) in locations between the forward ends of the wipers and the binder-holding grippers 72. At the same time the bars 302 of the units are moved in outward directions by the levers 398 to cause the anvils 392 to engage the inner face of the lip of the insole, so that the lip and the margin of the upper are clamped between the throats and the anvils. To insure that the portions of the binder engaged by the staples will be positioned in proper relation to the staple-guiding passageways in the throats, the fingers 414 are moved inwardly with the throats to cause their lips 416 to engage the binder underneath and by further movements of the throats are swung upwardly to definite positions relatively to the passageways. After the throats have engaged the upper, further straightening of the toggles 362, 364 serves to move the blocks 372 (Fig. 18) outwardly against the resistance of the springs 374, so that these blocks assume positions determined by the positions of the throats, the straightening of the toggles being positively limited by the stop members 412.

As the stapling units are swung downwardly in the manner above described, the driver-operating pistons 442 are pulled downwardly by the units to position their upper ends below the ports 450 (Fig. 2) and these ports also are uncovered by the pistons 382 in the downward movements of these pistons. This serves to admit the operating fluid from the cylinders 384 to the cylinders 444. Operative movements of the staple drivers are, however, prevented by the stop members 456 (Fig. 13) until these members are displaced by the toggle links 362 (Fig. 28) near the end of the operative movements of the throat-operating toggles, whereupon the drivers are operated by the toggles 430, 432. The staples are thus driven through the margin of the upper and the lip of the insole and their legs are clinched in directions toward the heel end of the shoe by the anvils 392 (Fig. 31). The straightening of the driver-operating toggles is limited by the stop members 412. Since the links 432 of the driver-operating toggles are connected to the blocks 372 which, as already described, are moved to positions determined by the positions of the throats 328 when the latter are in engagement with the upper, the driver-operating toggles are adjusted by the blocks so that the limits of the operative movements of the drivers are determined in accordance with the positions of the throats. Insurance is thus afforded that when the drivers are at the limits of their staple-driving movements their end faces will be in a definitely predetermined relation to the ends of the staple-guiding passageways in the throats, which relation may be varied by turning the eccentric studs 370 (Fig. 18).

Before the staple drivers complete their staple-driving movements the grippers 72 are opened to release the ends of the binder by reason of the action of the arms 478, operated by the driver-operating toggles, on the cam members 202 associated with the gripper jaws (Fig. 30). Although the grippers are thus opened before the binder is fastened, it is held in proper relation to the upper by the wipers. Upon the opening of the grippers they are moved farther forwardly by the spring 256 (Fig. 3) and, it may be, also later by the portion *i* of the cam track 252, to clear the ends of the binder, and in response to their forward movements they are retracted from the shoe widthwise thereof by the action of the cam slides 488 (Fig. 12) on the bell-crank levers 264, these cam slides thereafter serving to hold the grippers retracted as they are returned lengthwise of the shoe.

After the driving of the staples, the increase of the pressure of the operating fluid acting on the pistons 382 and 442 due to the fact that the pistons have reached the limits of their movements causes the piston 588 (Fig. 3) to move the latch 580 out of its valve-holding position, whereupon the valve 540 is returned by the spring 560 to its initial position and releases the fluid in the cylinders 384 and 444. The springs 390 and 448 then act to return the parts of the stapling units to their initial positions and, as soon as the outside formers 334 and the cutters 358 are retracted beyond the lower ends of the strands of staple-forming wire, to impart also to the stapling units their upward swinging movements about the axes of the shafts 308. The units thus move upwardly along the strands of wire, which are held against upward movement by the brake members 506, and they thereby receive the wire for use in forming the next staples, the upward movement of each unit being limited by its engagement with the end of the wire. As the two units near the limits of their upward movements they close the switches 668 and thereby establish a circuit through the solenoid 658 to actuate the clutch and cause the machine to resume its cycle of operations, another switch 674 in the same circuit having been previously closed by the cam 676 just prior to the pause in the cycle. This switch is immediately opened again to break the circuit as the machine resumes its cycle, so that it may be stopped at the end of the cycle by the cam-operated clutch-controlling means. It will be understood that in the remainder of the cycle the parts of the machine not already in their starting positions are returned to those positions. As the shoe is released by the heel rest and the toe rest it falls, still bottom upward, into the shoe receiver 685 which is swung downwardly and also extended by the weight of the shoe and assumes the position in which it is shown by broken lines in Fig. 1 where the shoe will not interfere with the presentation of another shoe to the machine. The operator may already have another shoe in his hands before the machine completes its cycle, and after presenting it and again starting the machine he removes from the shoe receiver the shoe just operated upon.

Novel features of the means herein disclosed for forming and driving staples are claimed in a divisional application Serial No. 608,704, filed on August 3, 1945.

Having described the invention, what I claim as new and desire to secure by Letters Patent of the United States is:

1. In a lasting machine, wipers for wiping the toe-end portion of an upper on a last into lasted position, a wiper carrier supporting said wipers and movable relatively to the last in the lasting operation, slides supported by said wiper carrier to move rectilinearly lengthwise of the last relatively to said carrier, and means on said slides for engaging the opposite end portions of a toe binder and for pulling the binder against the toe end of the upper in response to such movements of the slides.

2. In a lasting machine, wipers for wiping the toe-end portion of an upper on a last into lasted position, a wiper carrier supporting said wipers and movable relatively to the last in the lasting operation, slides supported by said wiper carrier to move rectilinearly lengthwise of the last relatively to said carrier, and grippers carried by said slides for gripping a toe binder at the opposite sides of the last and for pulling the binder against the toe end of the upper in response to such movements of the slides.

3. In a lasting machine, means movable to wipe the marginal portion of an upper about the toe end of a last inwardly over an insole on the last and against a lip on the insole, a pair of slides mounted to move relatively to said wiping means lengthwise of the last at its opposite sides respectively, and grippers carried by said slides for gripping a binder extending about the toe end of the upper and for pulling the binder inwardly against the margin of the upper opposite the lip of the insole in response to the movements of the slides.

4. In a lasting machine, means movable to wipe the marginal portion of an upper about the toe end of a last inwardly over an insole on the last and against a lip on the insole, members bodily movable relatively to said wiping means lengthwise of the last along its opposite sides respectively, grippers carried by said members for gripping a binder extending about the toe end of the upper and for pulling the binder inwardly against the margin of the upper opposite the lip of the insole in response to the movements of the members, and spring means for thus moving said members.

5. In a lasting machine, wipers movable to wipe the marginal portion of an upper about the toe end of a last inwardly over an insole on the last and against a lip on the insole, members mounted for movements lengthwise of the last along its opposite sides respectively, grippers carried by said members for gripping a binder extending about the toe end of the upper and for pulling the binder inwardly against the margin of the upper opposite the lip of the insole in response to the movements of the members, and means for thus moving said members independently of the movements of the wipers in automatically determined time relation to the wiping of the upper over the insole.

6. In a lasting machine, wipers movable to wipe the marginal portion of an upper about the toe end of a last inwardly over an insole on the last and against a lip on the insole, members mounted for movements lengthwise of the last along its opposite sides respectively, grippers carried by said members for gripping a binder extending about the toe end of the upper and for pulling the binder inwardly against the margin of the upper opposite the lip of the insole in response to the movements of the members, arms mounted for swinging movements and arranged respectively to operate said different members, and cam-controlled means for operating said arms in automatically determined time relation to the movements of the wipers.

7. In a lasting machine, wipers movable to wipe the marginal portion of an upper about the toe end of a last inwardly over an insole on the last and against a lip on the insole, members mounted for movements lengthwise of the last along its opposite sides respectively, grippers carried by said members for gripping a binder extending about the toe end of the upper and for pulling the binder inwardly against the margin of the upper opposite the lip of the insole in response to the movements of the members, arms mounted for swinging movements and arranged respectively to operate said different members, spring means for yieldingly operating said arms, and cam means for controlling the movements of said arms and for releasing them to the action of said spring means.

8. In a lasting machine, power-operated wipers movable to wipe the marginal portion of an upper about the toe end of a last inwardly over an insole on the last and against a lip on the insole, grippers arranged to grip at the opposite sides of the last a binder extending about the toe end of the upper, and means for moving said grippers lengthwise of the last in automatically determined time relation to the movements of the wipers but independently of said movements to pull the binder inwardly against the margin of the upper opposite the lip of the insole.

9. In a lasting machine, power-operated wipers movable to wipe the marginal portion of an upper about the toe end of a last inwardly over an insole on the last and against a lip on the insole, grippers arranged to grip at the opposite sides of the last a binder extending about the toe end of the upper, arms arranged to extend heightwise of the last and connected to said grippers, and means for swinging said arms each about an axis extending widthwise of the last in automatically determined time relation to the movements of the wipers to move the grippers lengthwise of the last and thereby to pull the binder inwardly against the margin of the upper opposite the lip of the insole.

10. In a lasting machine, wipers movable to wipe the toe-end portion of an upper on a last into lasted position, a wiper carrier supporting said wipers and movable to carry them heightwise of the last in the course of the lasting operation, grippers supported by said wiper carrier for gripping at the opposite sides of the last a binder extending about the toe end of the upper, and means for moving said grippers lengthwise of the last in automatically determined time relation to the movements of the wipers but independently of said movements to pull the binder against the toe end of the upper.

11. In a lasting machine, wipers movable to wipe the marginal portion of an upper about the toe end of a last inwardly over an insole on the last and against a lip on the insole, a wiper carrier supporting said wipers and movable to carry them heightwise of the last in wiping engagement with the upper prior to their movements to wipe the upper inwardly over the insole, grippers supported by said wiper carrier for gripping at the opposite sides of the last a binder extending about the toe end of the upper, and means for moving said grippers lengthwise of the last in automatically determined time relation to the wiping movements of the wipers after their movements heightwise of the last to pull the binder inwardly between the wiping faces of the wipers and the upper and against the margin of the upper opposite the lip of the insole.

12. In a power-operated lasting machine, means for working the toe-end portion of an upper on a last into lasted position in the course of the power operation of the machine, grippers for gripping at the opposite sides of the last a binder extending about the toe end of the upper, and automatic means for closing said grippers on the binder in the course of the power operation of the machine and for operating them simultaneously to pull the binder lengthwise of the last against the upper.

13. In a power-operated lasting machine, wipers for wiping the marginal portion of an upper about the toe end of a last inwardly over an insole on the last and against a lip on the insole in the course of the power operation of the machine, grippers for gripping at the opposite sides of the last a binder extending about the toe end of the upper, and automatic means for closing said grippers on the binder in the course of the power operation of the machine and for moving them simultaneously lengthwise of the last to pull the binder inwardly against the margin of the upper opposite the lip of the insole.

14. In a lasting machine, wipers movable to wipe the marginal portion of an upper about the toe end of a last inwardly over an insole on the last and against a lip on the insole, a wiper carrier supporting said wipers and movable to carry them heightwise of the last prior to their movements to wipe the upper inwardly over the insole, grippers supported by said wiper carrier for gripping at the opposite sides of the last a binder extending about the toe end of the upper, means for closing said grippers on the binder in the course of the movements of the wipers heightwise of the last, and means for thereafter moving said grippers lengthwise of the last to pull the binder inwardly against the margin of the upper opposite the lip of the insole.

15. In a lasting machine, wipers for wiping the toe-end portion of an upper on a last into lasted position, a wiper carrier supporting said wipers and movable relatively to the last in the lasting operation, grippers supported by said wiper carrier for gripping a toe binder at the opposite sides of the last and for pulling the binder lengthwise of the last against the toe end of the upper, and means controlled by movement of the wiper carrier for closing said grippers on the binder.

16. In a lasting machine, wipers for wiping the toe-end portion of an upper on a last into lasted position, a wiper carrier supporting said wipers and movable to carry them heightwise of the last, grippers supported by said wiper carrier for gripping a toe binder at the opposite sides of the last and for pulling the binder lengthwise of the last against the toe end of the upper, and means for closing said grippers on the binder in response to the movement of the wiper carrier heightwise of the last.

17. In a lasting machine, wipers for wiping the toe-end portion of an upper on a last into lasted position, a wiper carrier supporting said wipers and movable to carry them heightwise of the last, grippers supported by said wiper carrier for gripping a toe binder at the opposite sides of the last and for pulling the binder lengthwise of the last against the toe end of the upper, devices associated with said grippers for closing them on the binder, and members into engagement with which said devices are carried by the movement of the wiper carrier heightwise of the last for operating them to close the grippers.

18. In a lasting machine, wipers for wiping the toe-end portion of an upper on a last into lasted position, a wiper carrier supporting said wipers and movable to carry them heightwise of the last, grippers supported by said wiper carrier for gripping a toe binder at the opposite sides of the last and for pulling the binder lengthwise of the last against the toe end of the upper, cams also supported by said wiper carrier and mounted for turning movements to close said grippers on the binder, members for turning said cams, and stops into engagement with which said members are carried by the movement of the wiper carrier heightwise of the last for operating the members thus to turn the cams.

19. In a lasting machine, wipers movable to wipe the marginal portion of an upper about the toe end of a last inwardly over an insole on the last and against a lip on the insole, a wiper carrier supporting said wipers and movable to carry them heightwise of the last in wiping engagement with the upper prior to their movements to wipe the upper inwardly over the insole, grippers supported by said wiper carrier for gripping a toe binder at the opposite sides of the last, means for closing said grippers on the binder in response to the movement of the wiper carrier heightwise of the last, and means for thereafter moving said grippers lengthwise of the last to pull the binder inwardly against the margin of the upper opposite the lip of the insole.

20. In a lasting machine, means for working the toe-end portion of an upper on a last into lasted position, devices for engaging at the opposite sides of the last a binder extending about the toe end of the upper, means for moving said devices lengthwise of the last to pull the binder against the toe end of the upper, and additional means controlled by the movements of said devices lengthwise of the last for moving them also inwardly widthwise of the last to position the binder relatively to the upper at the sides of the shoe.

21. In a lasting machine, means for working the toe-end portion of an upper on a last into lasted position, devices for engaging at the opposite sides of the last a binder extending about the toe end of the upper, means for moving said devices lengthwise of the last to pull the binder against the toe end of the upper, and spring means controlled by the movements of said devices lengthwise of the last for moving them also inwardly widthwise of the last to positions determined by their engagement with the upper to position the binder relatively to the upper at the sides of the shoe.

22. In a lasting machine, means for working the toe-end portion of an upper on a last into lasted position, grippers for gripping at the opposite sides of the last a binder extending about the toe end of the upper, members supporting said grippers and relatively to which the grippers are movable widthwise of the last, means for moving said members lengthwise of the last to cause the grippers to pull the binder against the toe end of the upper, and means controlled by the movements of said members lengthwise of the last for moving the grippers inwardly widthwise of the last to position the binder relatively to the upper at the sides of the shoe.

23. In a lasting machine, means for working the toe-end portion of an upper on a last into lasted position, grippers for gripping at the opposite sides of the last a binder extending about the toe end of the upper, members supporting said grippers and relatively to which the grippers are movable widthwise of the last, means for moving said members lengthwise of the last to cause the grippers to pull the binder against the toe end of the upper, springs for moving the grippers inwardly widthwise of the last to position the binder relatively to the upper at the sides of the shoe, and levers carried by said members for releasing the grippers to the action of said springs as said members are moved lengthwise of the last.

24. In a lasting machine, means for working the toe-end portion of an upper on a last into lasted position, slides mounted for movements lengthwise of the last at the opposite sides thereof respectively, other slides mounted on said first-named slides for movements widthwise of the last, grippers carried by said other slides for gripping at the sides of the last a binder extending about the toe end of the upper, and means for moving said first-named slides lengthwise of the last and said other slides widthwise of the last to cause the grippers to pull the binder against the toe end of the upper and to position it relatively to the upper at the sides of the shoe.

25. In a lasting machine, wipers movable to wipe the marginal portion of an upper about the toe end of a last inwardly over an insole on the last and against a lip on the insole, a wiper carrier supporting said wipers and movable relatively to the last in the lasting operation, grippers supported by said wiper carrier for gripping at the sides of the last a binder extending about the toe end of the upper, means for moving said grippers lengthwise of the last independently of the movements of the wipers to pull the binder inwardly against the margin of the upper opposite the lip of the insole, and additional means for moving said grippers widthwise of the last in automatically determined time relation to their movements lengthwise of the last to position the binder relatively to the upper at the sides of the shoe.

26. In a lasting machine, wipers movable to wipe the marginal portion of an upper about the toe end of a last inwardly over an insole on the last and against a lip on the insole, a wiper carrier supporting said wipers and movable relatively to the last in the lasting operation, grippers supported by said wiper carrier for gripping at the sides of the last a binder extending about the toe end of the upper, means for moving said grippers lengthwise of the last independently of the movements of the wipers to pull the binder inwardly against the margin of the upper opposite the lip of the insole, and additional means controlled by the movements of the grippers lengthwise of the last for also moving them widthwise of the last to position the binder relatively to the upper at the sides of the shoe.

27. In a lasting machine, means for working the marginal portion of an upper about the toe end of a last inwardly over an insole on the last and against a lip on the insole, grippers for gripping at the opposite sides of the last a binder extending about the toe end of the upper, and means for moving said grippers lengthwise of the last to pull the binder inwardly against the margin of the upper opposite the lip of the insole and for moving them also widthwise of the last to position the binder relatively to the upper at the sides of the shoe, said grippers being arranged to be deflected by the shoe heightwise thereof into positions to enter the angle between the feather and the lip of the insole in their movements widthwise of the last.

28. In a lasting machine, means for working the marginal portion of an upper about the toe end of a last inwardly over an insole on the last and against a lip on the insole, grippers for gripping at the opposite sides of the last a binder extending about the toe end of the upper, means for moving said grippers lengthwise of the last to pull the binder inwardly against the margin of the upper opposite the lip of the insole and for moving them also widthwise of the last to position the binder relatively to the upper at the sides of the shoe, said grippers being further movable heightwise of the last by deflecting action of the shoe thereon into positions to enter the angle between the feather and the lip of the insole in their movements widthwise of the last, springs against the resistance of which the grippers are thus movable heightwise of the last, and means for adjusting the grippers heightwise of the last.

29. In a lasting machine, means for working the marginal portion of an upper about the toe end of a last inwardly over an insole on the last and against a lip on the insole, grippers for gripping at the opposite sides of the last a binder extending about the toe end of the upper, means for moving said grippers lengthwise of the last to pull the binder inwardly against the margin of the upper opposite the lip of the insole and for moving them also widthwise of the last to position the binder relatively to the upper at the sides of the shoe, said grippers being further movable heightwise of the last by deflecting action of the shoe thereon into positions to enter the angle between the feather and the lip of the insole in their movements widthwise of the last, members associated with said grippers for guiding them in their movements widthwise of the last, and springs controlling said members and against the resistance of which the grippers and members are movable heightwise of the last by the deflecting action of the shoe on the grippers.

30. In a lasting machine, means for working the toe-end portion of an upper on a last into lasted position, means for feeding binder material into position to extend about the toe end of the upper for use as a toe binder, devices arranged to engage the binder at the opposite sides of the last respectively, and means for moving said devices simultaneously lengthwise of the last to pull the binder against the upper.

31. In a lasting machine, means for working the toe-end portion of an upper on a last into lasted position, means for feeding binder wire end foremost in a curved path into position to extend about the toe end of the upper for use as a toe binder, means for engaging the end of said wire to limit the feed thereof, and means for severing from the wire a portion to serve as a binder and for applying the binder to the upper.

32. In a lasting machine, means for working the toe-end portion of an upper on a last into lasted position, grippers for gripping at the opposite sides of the last a binder extending about the toe end of the upper and for simultaneously pulling the binder lengthwise of the last against the upper, and means for feeding binder material into position to extend about the toe end of the upper and to be gripped by said grippers.

33. In a lasting machine, means for working the toe-end portion of an upper on a last into lasted position, a pair of grippers for gripping respectively at the opposite sides of the last a binder extending about the toe end of the upper and for pulling the binder lengthwise of the last against the upper, and means for feeding a strand of binder material end foremost through one of said grippers about the toe end of the last and into position to be gripped also by the other gripper.

34. In a lasting machine, means for working the toe-end portion of an upper on a last into lasted position, a pair of grippers for gripping respectively at the opposite sides of the last a binder extending about the toe end of the upper and for pulling the binder lengthwise of the last against the upper, and means for feeding binder wire end foremost through one of said grippers about the toe end of the last and into position to be gripped also by the other gripper, said other gripper being provided with means for engaging the end of the wire to limit its feeding movement.

35. In a lasting machine, means for working the toe-end portion of an upper on a last into lasted position, a pair of grippers for gripping respectively at the opposite sides of the last a binder extending about the toe end of the upper and for pulling the binder lengthwise of the last against the upper, means for feeding a strand of binder material end foremost in a curved path into position to extend about the toe end of the upper and to be gripped by said grippers, and a cutter adjacent to one of said grippers for severing from the material a portion to serve as a binder.

36. In a lasting machine, wipers for wiping the toe-end portion of an upper on a last into lasted position, a wiper carrier supporting said wipers and movable to carry them heightwise of the last, grippers for gripping a toe binder at the opposite sides of the last and for pulling the binder lengthwise of the last against the toe end of the upper, means for feeding binder material into position to extend about the toe end of the upper for use as a binder, and means for severing from the binder material a portion to serve as a binder in response to the movement of the wiper carrier heightwise of the last.

37. In a lasting machine, wipers for wiping the toe-end portion of an upper on a last into lasted position, a wiper carrier supporting said wipers and movable to carry them heightwise of the last, grippers supported by said wiper carrier for gripping a toe binder at the opposite sides of the last and for pulling the binder lengthwise of the last against the toe end of the upper, means for feeding binder material into position to extend about the toe end of the upper for use as a binder, a cutter also supported by said wiper carrier for severing from the binder material a portion to serve as a binder, and means for operating said cutter in response to the movement of the wiper carrier heightwise of the last.

38. In a lasting machine, wipers for wiping the toe-end portion of an upper on a last into lasted position, a wiper carrier supporting said wipers and movable to carry them heightwise of the last, grippers supported by said wiper carrier for gripping a toe binder at the opposite sides of the last and for pulling the binder lengthwise of the last against the toe end of the upper, means for feeding a strand of binder material into position to extend about the toe end of the upper and to be gripped by said grippers, a cutter also supported by said wiper carrier for cutting the material at one side of the last, and means responsive to the movement of said wiper carrier heightwise of the last for operating said cutter and for closing said grippers on the binder.

39. In a lasting machine, means for working the toe-end portion of an upper on a last into lasted position, means for feeding binder material for use as a binder to hold the upper, a guide for said binder material having a guideway for directing it in a curved path into position to extend about the toe end of the upper, and means for applying the binder to the upper.

40. In a lasting machine, means for working the toe-end portion of an upper on a last into lasted position, means for feeding binder material for use as a binder to hold the upper, a guide for said binder material having a guideway for directing it in a curved path into position to extend about the toe end of the upper, means for severing from the material a portion to serve as a binder, and grippers arranged to grip the opposite end portions of the binder and to pull the binder against the upper.

41. In a lasting machine, wipers for wiping the toe-end portion of an upper on a last into lasted position, means for feeding a strand of binder material end foremost to provide a binder for holding the upper, a guide for said binder material having a guideway for directing it in a curved path into position to extend about the toe end of the upper, and means for moving the binder away from said guide and relatively to the wipers to apply it to the upper.

42. In a lasting machine, wipers for wiping the toe-end portion of an upper on a last into lasted position, means for feeding a strand of binder material end foremost to provide a binder for holding the upper, a guide for said binder material having a guideway for directing it in a curved path into position to extend about the toe end of the upper, means for severing from the material a portion to serve as a binder, and grippers arranged to grip the opposite end portions of the binder and to pull the binder lengthwise of the shoe away from said guide and against the upper.

43. In a lasting machine, wipers for wiping the toe-end portion of an upper on a last into lasted position, means for feeding a strand of binder material end foremost to provide a binder for holding the upper, a guide for said binder material relatively to which the wipers are movable in operating on the upper, said guide having a guideway for directing the material in a curved path into position to extend about the toe end of the upper, means for severing from the material a portion to serve as the binder, and means for withdrawing the binder from said guide and for applying it to the upper.

44. In a lasting machine, wipers for wiping the toe-end portion of an upper on a last into lasted position, a wiper carrier supporting said wipers and movable to carry them heightwise of the last, means for feeding a strand of binder material end foremost to provide a binder for holding the upper, a guide for said binder material supported by said wiper carrier near the wipers, said guide having a guideway for directing the material in a curved path into position to extend about the toe end of the upper, means for severing from the material a portion to serve as a binder, and grippers also supported by said wiper carrier for gripping the end portions of the binder and for applying it to the upper.

45. In a lasting machine, wipers for wiping the toe-end portion of an upper on a last into lasted position, means for feeding a strand of binder material end foremost to provide a binder for holding the upper, a guide for said binder material positioned near the wipers but farther from the shoe than their wiping edges, said guide having a guideway for directing the material in a curved path into position to extend about the toe end of the upper, means for severing from the material a portion to serve as a binder, and means for withdrawing the binder from said guide and for applying it to the upper.

46. In a lasting machine, wipers for wiping the toe-end portion of an upper on a last into lasted position, means for feeding a strand of binder material end foremost to provide a binder for holding the upper, a guide for said binder material having a guideway for directing the material in a curved path into position to extend about the toe end of the upper, grippers arranged to aline with said guideway at its opposite ends respectively for also receiving the binder material fed to the guideway, means for severing from the material a portion to serve as a binder, and means for operating said grippers to withdraw the binder from said guideway and to apply it to the upper.

47. In a lasting machine, wipers for wiping the toe-end portion of an upper on a last into lasted position, means for feeding a strand of binder material end foremost to provide a binder for holding the upper, a guide for said binder material having a guideway for directing the material in a curved path into position to extend about the toe end of the upper, said guide having portions relatively movable to uncover said guideway on the side toward the shoe after the material has been fed, and means for withdrawing the binder from said guideway after it has thus been uncovered and for applying the binder to the upper.

48. In a lasting machine, wipers for wiping the toe-end portion of an upper on a last into lasted position, means for feeding a strand of binder material end foremost to provide a binder for holding the upper, a guide for said binder material having a guideway for directing the material in a curved path into position to extend about the toe end of the upper, said guide having portions relatively movable to uncover said guideway on the side toward the shoe after the material has been fed, means for severing from the material a portion to serve as a binder, and grippers arranged to grip the opposite end portions of the binder and to pull it out of said guideway and against the upper after the guideway has thus been uncovered.

49. In a lasting machine, wipers for wiping the toe-end portion of an upper on a last into lasted position, a wiper carrier supporting said wipers and movable to carry them heightwise of the last, means for feeding a strand of binder material end foremost to provide a binder for holding the upper, a guide for said binder material supported by said wiper carrier and having a guideway for directing the material in a curved path into position to extend about the toe end of the upper, said guide having portions relatively movable in response to the movement of the wiper carrier heightwise of the last to uncover said guideway on the side toward the shoe, means for severing from the binder material a portion to serve as a binder, and means for withdrawing the binder from said guideway after it has thus been uncovered and for applying the binder to the upper.

50. In a lasting machine, wipers for wiping the toe-end portion of an upper on a last inwardly over an insole on the last and against a lip on the insole, means for feeding a strand of binder material end foremost to provide a binder for holding the upper, a guide for said binder material having a guideway for directing the material in a curved path into position to extend about the toe end of the upper, said guide having portions relatively movable to uncover said guideway on the side toward the shoe after the material has been fed, means for severing from the material a portion to serve as a binder, means for withdrawing the binder from said guideway after it has thus been uncovered and for applying the binder to the margin of the upper opposite the lip of the insole, and a member at the extreme end of the toe for guiding the binder to a position between the upper and the wiping faces of the wipers when it is thus withdrawn from said guideway.

51. In a lasting machine, wipers for wiping the toe-end portion of an upper on a last inwardly over an insole on the last and against a lip on the insole, means for feeding a strand of binder material end foremost to provide a binder for holding the upper, a guide for said binder material having a guideway for directing the material in a curved path into position to extend about the toe end of the upper, said guide having portions relatively movable to uncover said guideway on the side toward the shoe after the material has been fed, means for severing from the material a portion to serve as a binder, grippers arranged to grip the opposite end portions of the binder and to pull it out of said guideway and inwardly against the margin of the upper opposite the lip of the insole after the guideway has thus been uncovered, and a member at the extreme end of the toe for deflecting the binder heightwise of the last to a position contiguous to the wiping faces of the wipers when it is thus withdrawn from said guideway.

52. In a power-operated lasting machine, wipers movable to wipe the marginal portion of an upper about the toe end of a last inwardly over an insole on the last and against a lip on the insole in the course of a cycle of power operations of the machine, automatic means for interrupting the cycle of operations after such movements of the wipers and while they are holding the marginal portion of the upper in inwardly wiped position, and automatic means for engaging at the opposite sides of the shoe a binder extending about the toe end of the upper and by such engagement pulling the binder inwardly against the margin of the upper opposite the lip of the insole in the course of the cycle of operations prior to such interruption of the cycle.

53. In a power-operated lasting machine, wipers movable to wiper the marginal portion of an upper about the toe end of a last inwardly over an insole on the last and against a lip on the insole in the course of a cycle of power operations of the machine, automatic means for interrupting the cycle of operations after such movements of the wipers and while they are holding the marginal portion of the upper in inwardly wiped position, grippers arranged to grip at the opposite sides of the shoe a binder extending about the toe end of the upper, and automatic means for moving said grippers lengthwise of the shoe to pull the binder inwardly against the margin of the upper opposite the lip of the insole in the course of the cycle of operations prior to such interruption of the cycle.

54. In a power-operated lasting machine, wipers movable to wipe the marginal portion of an upper about the toe end of a last inwardly over an insole on the last and against a lip on the insole in the course of a cycle of power operations of the machine, a wiper carrier supporting said wipers and movable to carry them heightwise of the last in wiping engagement with the upper prior to their movements to wipe the upper inwardly over the insole, automatic means for interrupting the cycle of operations after the wipers have thus wiped the upper inwardly and while they are holding it in overwiped position, grippers supported on said wiper carrier for gripping at the opposite sides of the shoe a binder extending about the toe end of the upper, and automatic means for moving said grippers lengthwise of the shoe relatively to the wiper carrier to pull the binder inwardly against the margin of the upper opposite the lip of the insole in the course of the cycle of operations prior to such interruption of the cycle.

55. In a power-operated lasting machine, wipers for wiping the marginal portion of an upper about the toe end of a last inwardly over an insole on the last and against a lip on the insole, automatic means for operating said wipers thus to wipe the upper inwardly and for then partially retracting them and moving them inwardly a second time, and means movable in automatically determined time relation to the movements of the wipers to apply a binder to the margin of the upper opposite the lip of the insole in position to be pressed inwardly against the margin of the upper by the wipers in their second inward wiping movements.

56. In a power-operated lasting machine, wipers for wiping the marginal portion of an upper about the toe end of a last inwardly over an insole on the last and against a lip on the insole, automatic means for operating said wipers thus to wipe the upper inwardly and for then partially retracting them and moving them inwardly a second time, grippers arranged to grip at the opposite sides of the shoe a binder extending about the toe end of the upper, and means for moving said grippers lengthwise of the shoe in automatically determined time relation to the movements of the wipers to pull the binder inwardly between the wipers and the upper into position to be pressed inwardly against the margin of the upper opposite the lip of the insole by the wipers in their second inward wiping movements.

57. In a lasting machine, means for working the toe-end portion of an upper on a last into lasted position, means for feeding binder material into position to extend about the toe end of the upper to provide a binder for holding the upper, devices arranged to engage the binder at the opposite sides of the last respectively and movable lengthwise of the last to pull the binder into upper-holding position, and devices for inserting fastenings after the binder has thus been applied to secure it in upper-holding position.

58. In a lasting machine, means for wiping the marginal portion of an upper about the toe end of a last inwardly over an insole on the last and against a lip on the insole, means for feeding binder material into position to extend about the toe end of the upper to provide a binder for holding the upper, grippers arranged to grip the binder at the opposite sides of the last and to pull it lengthwise of the last into engagement with the margin of the upper opposite the lip of the insole, and devices for inserting fastenings in directions widthwise of the last into the upper and the lip to fasten the binder to the shoe.

59. In a lasting machine, wipers for wiping the marginal portion of an upper about the toe end of a last inwardly over an insole on the last and against a lip on the insole, grippers arranged to grip the opposite end portions of a binder extending about the toe end of the upper and movable to pull the binder inwardly lengthwise of the last between the wiping faces of the wipers and the upper to apply it to the margin of the upper opposite the lip of the insole, and devices for driving fastenings in directions widthwise of the last through the upper and the lip of the insole to fasten the binder after it has thus been applied.

60. In a lasting machine, means for applying a binder about the toe end of an upper to hold the upper in lasted position in the angle between the feather and the lip of a welt shoe insole, devices arranged to drive fastenings in directions widthwise of the shoe through the upper and the lip of the insole to fasten the binder, and means for engaging said fastenings at the inner side of the lip and for clinching them on the lip in directions toward the heel end of the shoe.

61. In a lasting machine, means for applying a binder about the toe end of an upper to hold the upper in lasted position in the angle between the feather and the lip of a welt shoe insole, devices for driving staples in directions widthwise of the shoe through the upper and the lip of the insole in positions to straddle the binder and fasten it to the shoe, and clinching means arranged to engage the legs of said staples at the inner side of the lip and to deflect them in directions toward the heel end of the shoe and outwardly into the lip to anchor them.

62. In a lasting machine, means for working the toe-end portion of an upper on a last into lasted position, grippers arranged to grip at the opposite sides of the last a binder extending about the toe end of the upper and to apply the binder to the upper to hold it in lasted position, devices movable to insert fastenings at the opposite sides of the shoe to fasten the binder, and means for releasing said grippers from the binder by the movements of said devices.

63. In a lasting machine, means for working the toe-end portion of an upper on a last into lasted position, grippers arranged to grip at the opposite sides of the last a binder extending about the toe end of the upper and to apply the binder to the upper to hold it in lasted position, said grippers having binder-gripping jaws and members for holding them closed on the binder, and devices movable to insert fastenings at the opposite sides of the shoe to fasten the binder to the shoe, said members being movable to release the grippers from the binder in response to the movements of said devices.

64. In a lasting machine, means for working the toe-end portion of an upper on a last into lasted position, grippers arranged to grip at the opposite sides of the last a binder extending about the toe end of the upper and to apply the binder to the upper to hold it in lasted position, said grippers having binder-gripping jaws and members for holding them closed on the binder, drivers movable to drive fastenings at the opposite sides of the shoe to fasten the binder to the shoe, and devices movable with said drivers for operating said members to release the grippers from the binder.

65. In a lasting machine, means for working the toe-end portion of an upper on a last into lasted position, grippers arranged to grip at the opposite sides of the last a binder extending about the toe end of the upper and to apply the binder to the upper to hold it in lasted position, means for fastening the binder to the shoe, means for releasing the grippers from the binder in time relation to the operation of said fastening means, and means for moving the grippers into positions to clear the binder when they are thus released.

66. In a lasting machine, means for wiping the marginal portion of an upper about the toe end of a last inwardly over an insole on the last and against a lip on the insole, grippers arranged to grip at the opposite sides of the last a binder extending about the toe end of the upper, spring means for moving said grippers lengthwise of the last to pull the binder inwardly against the margin of the upper opposite the lip of the insole, means for fastening the binder to the shoe, and means for releasing the grippers from the binder in time relation to the operation of said fastening means, the grippers being further movable lengthwise of the last by said spring means to clear the binder when they are thus released.

67. In a lasting machine, means for working the toe-end portion of an upper on a last into lasted position, grippers arranged to grip at the opposite sides of the last a binder extending about the toe end of the upper, means for moving said grippers lengthwise of the last to apply the binder to the upper, means for fastening the binder to the shoe, means for releasing the grippers from the binder in time relation to the operation of said fastening means, and means for retracting the grippers from the shoe widthwise thereof and for imparting to them return movements lengthwise of the shoe while they are thus retracted.

68. In a lasting machine, means for wiping the marginal portion of an upper about the toe end of a last inwardly over an insole on the last and against a lip on the insole, grippers arranged to grip at the opposite sides of the last a binder extending about the toe end of the upper, means for moving said grippers lengthwise of the last to pull the binder inwardly against the margin of the upper opposite the lip of the insole and for also moving them inwardly widthwise of the last to position the binder in the angle between the feather and the lip of the insole at the sides of the shoe, means for fastening the binder to the shoe, means for releasing the grippers from the binder, and means for retracting the grippers from the shoe widthwise thereof after they are thus released and for imparting to them return movements lengthwise of the shoe while they are thus retracted.

69. In a lasting machine, means for wiping the marginal portion of an upper about the toe end of a last inwardly over an insole on the last and against a lip on the insole, grippers arranged to grip the opposite end portions of a binder extending about the toe end of the upper, means for moving said grippers lengthwise and widthwise of the last to apply the binder to the upper in the angle between the feather and the lip of the insole and for moving them thereafter farther in the same direction lengthwise of the last to clear the ends of the binder prior to return movements thereof in the opposite direction, and cam members for retracting the grippers from the shoe widthwise thereof in response to their movements to clear the ends of the binder, said cam members being movable with the grippers in the course of their return movements to maintain them in retracted positions.

70. In a lasting machine, means for wiping the marginal portion of an upper about the toe end of a last inwardly over an insole on the last and against a lip on the insole, grippers arranged to grip the opposite end portions of a binder extending about the toe end of the upper, means for moving said grippers lengthwise and widthwise of the last to apply the binder to the upper in the angle between the feather and the lip of the insole and for moving them thereafter farther in the same direction lengthwise of the last to clear the ends of the binder prior to return movements thereof in the opposite direction, and devices for retracting the grippers from the shoe widthwise thereof in response to their movements to clear the ends of the binder and for holding them thus retracted in the course of their return movements.

71. In a lasting machine, means for applying a binder about the toe end of an upper to hold the upper in lasted position in the angle between the feather and the lip of a welt shoe insole, and mechanisms for inserting fastenings in directions widthwise of the shoe in the margin of the upper and the lip of the insole at the opposite sides of the shoe respectively to fasten the binder to the shoe, said mechanisms being movable heightwise of the shoe into engagement with the shoe to position them in proper relation to the lip prior to the insertion of the fastenings.

72. In a lasting machine, means for applying a binder about the toe end of an upper to hold the upper in lasted position in the angle between the feather and the lip of a welt shoe insole, and mechanisms for inserting fastenings in directions widthwise of the shoe through the margin of the upper and the lip of the insole at the opposite sides of the shoe respectively to fasten the binder to the shoe, said mechanisms including anvils for clinching the fastenings at the inner side of the lip and being movable heightwise of the shoe to positions determined by engagement of said anvils with the insole adjacent to the lip.

73. In a lasting machine, means for applying a binder about the toe end of an upper to hold the upper in lasted position in the angle between the feather and the lip of a welt shoe insole, mechanisms for inserting fastenings in directions widthwise of the shoe in the margin of the upper and the lip of the insole at the opposite sides of the shoe respectively to fasten the binder to the shoe, said mechanisms being movable heightwise of the shoe to positions determined by engagement with the shoe, and fluid-pressure means for thus moving the mechanisms until stopped by the shoe.

74. In a lasting machine, means for applying a binder about the toe end of an upper to hold the upper in lasted position in the angle between the feather and the lip of a welt shoe insole, mechanisms for inserting fastenings in directions widthwise of the shoe in the margin of the upper and the lip of the insole at the opposite sides of the shoe respectively to fasten the binder to the shoe, said mechanisms being mounted for swinging movements heightwise of the shoe to positions determined by their engagement with the insole farther inwardly over the insole than the lip, and means for thus swinging the mechanisms until stopped by the insole.

75. In a lasting machine, means for applying a binder about the toe end of an upper to hold the upper in lasted position in the angle between the feather and the lip of a welt shoe insole, and mechanisms for forming staples and for driving them through the margin of the upper and the lip of the insole at the opposite sides of the shoe respectively to fasten the binder to the shoe, said mechanisms being movable heightwise of the shoe to positions determined by their engagement with the shoe.

76. In a lasting machine, means for applying a binder about the toe end of an upper to hold the upper in lasted position in the angle between the feather and the lip of a welt shoe insole, and mechanisms for inserting fastenings in directions widthwise of the shoe in the margin of the upper and the lip of the insole at the opposite sides of the shoe respectively to fasten the binder to the shoe, said mechanisms being movable heightwise of the shoe to position them relatively to the shoe and each including members relatively movable thereafter to clamp the margin of the upper and the lip between them prior to the insertion of a fastening.

77. In a lasting machine, means for applying a binder about the toe end of an upper to hold the upper in lasted position in the angle between the feather and the lip of a welt shoe insole, and mechanisms for inserting fastenings in directions widthwise of the shoe in the margin of the upper and the lip of the insole at the opposite sides of the shoe respectively to fasten the binder to the shoe, said mechanisms each including members arranged respectively to engage the inner face of the lip and the margin of the upper outside of the lip and movable toward each other to clamp the upper and the lip between them.

78. In a lasting machine, means for applying a binder about the toe end of an upper to hold the upper in lasted position in the angle between the feather and the lip of a welt shoe insole, and mechanisms for inserting fastenings in directions widthwise of the shoe through the margin of the upper and the lip of the insole at the opposite sides of the shoe respectively to fasten the binder to the shoe, said mechanisms each including a throat member from which a fastening is driven and an anvil for clinching the fastening at the inner side of the lip, the throat member and the anvil being movable toward each other to clamp the margin of the upper and the lip between them.

79. In a lasting machine, means for applying a binder about the toe end of an upper to hold the upper in lasted position in the angle between the feather and the lip of a welt shoe insole, mechanisms for inserting fastenings in directions widthwise of the shoe through the margin of the upper and the lip of the insole at the opposite sides of the shoe respectively to fasten the binder to the shoe, said mechanisms each including a throat member from which a fastening is driven, an anvil for clinching the fastening at the inner side of the lip and a toggle for moving the throat member toward the anvil, and means associated with the toggle of each mechanism for also moving the anvil toward the throat member.

80. In a lasting machine, means for applying a binder about the toe end of an upper to hold the upper in lasted position in the angle between the feather and the lip of a welt shoe insole, mechanisms for inserting fastenings in directions widthwise of the shoe in the margin of the upper and the lip of the insole at the opposite sides of the shoe respectively to fasten the binder to the shoe, said mechanisms each including a bar arranged to extend widthwise of the shoe and having at one end an anvil for engaging the inner face of the lip, a throat member movable along said bar for engaging the margin of the upper and for guiding a fastening and means for thus moving said throat member, and additional means for moving the bar of each mechanism to carry the anvil toward the throat member.

81. In a lasting machine, means for applying a binder about the toe end of an upper to hold the upper in lasted position in the angle between the feather and the lip of a welt shoe insole, mechanisms for inserting fastenings in directions widthwise of the shoe in the margin of the upper and the lip of the insole at the opposite sides of the shoe respectively to fasten the binder to the shoe, said mechanisms each including an anvil for engaging the inner face of the lip and being each movable heightwise of the shoe to a position determined by engagement of said anvil with the insole farther inwardly over the insole than the lip, and means for moving the anvil of each mechanism outwardly to lip-engaging position after it has thus engaged the insole.

82. In a lasting machine, means for applying a binder about the toe end of an upper to hold the upper in lasted position in the angle between the feather and the lip of a welt shoe insole, mechanisms for inserting fastenings in directions widthwise of the shoe in the margin of the upper and the lip of the insole at the opposite sides of the shoe respectively to fasten the binder to the shoe, said mechanisms being movable heightwise of the shoe to positions determined by engagement with the insole and each including members relatively movable to clamp the margin of the upper and the lip between them, and means for effecting such relative movements of the members after the movements of the mechanisms heightwise of the shoe.

83. In a lasting machine, means for applying a binder about the toe end of an upper to hold the upper in lasted position in the angle between the feather and the lip of a welt shoe insole, mechanisms for inserting fastenings in directions widthwise of the shoe through the margin of the upper and the lip of the insole at the opposite sides of the shoe respectively to fasten the binder to the shoe, said mechanisms being movable heightwise of the shoe to positions determined by engagement with the insole and each including an anvil for clinching a fastening at the inner side of the lip and a throat member from which the fastening is driven, and means for moving the throat member and the anvil of each mechanism toward each other to clamp the margin of the upper and the lip between them after the movement of the mechanism heightwise of the shoe.

84. In a lasting machine, means for applying a binder about the toe end of an upper to hold the upper in lasted position in the angle between the feather and the lip of a welt shoe insole, mechanisms for inserting fastenings in directions widthwise of the shoe in the margin of the upper and the lip of the insole at the opposite sides of the shoe respectively to fasten the binder to the shoe, said mechanisms being mounted for movements heightwise of the shoe to positions determined by their engagement with the insole and each including members relatively movable to clamp the margin of the upper and the lip between them, fluid-operated members associated respectively with said different mechanisms, and means operated by each of said fluid-operated members for first moving the corresponding mechanism heightwise of the shoe and for then effecting the relative movement of its clamping members.

85. In a lasting machine, means for applying a binder about the toe end of an upper to hold the upper in lasted position in the angle between the feather and the lip of a welt shoe insole, mechanisms for forming staples and for driving them in directions widthwise of the shoe into the margin of the upper and the lip of the insole at the opposite sides of the shoe respectively to fasten the binder to the shoe, said mechanisms being mounted for movements heightwise of the shoe to positions determined by their engagement with the shoe, and means for thus moving said mechanisms heightwise of the shoe and for then operating them to form the staples in response to resistance of the shoe to their further movements heightwise thereof.

86. In a lasting machine, means for applying a binder about the toe end of an upper to hold the upper in lasted position in the angle between the feather and the lip of a welt shoe insole, mechanisms for forming staples and for driving them in directions widthwise of the shoe into the margin of the upper and the lip of the insole at the opposite sides of the shoe respectively to fasten the binder to the shoe, said mechanisms being mounted for movements heightwise of the shoe to positions determined by their engagement with the insole and each including a staple-forming member and a toggle for operating it, and means arranged to act through the toggle of each mechanism first to move the mechanism heightwise of the shoe and then to operate its staple-forming member in response to resistance of the shoe to further movement of the mechanism heightwise thereof.

87. In a lasting machine, means for applying a binder about the toe end of an upper to hold the upper in lasted position in the angle between the feather and the lip of a welt shoe insole, mechanisms for forming staples and for driving them in directions widthwise of the shoe into the margin of the upper and the lip of the insole at the opposite sides of the shoe respectively to fasten the binder to the shoe, said mechanisms being mounted for movements heightwise of the shoe to positions determined by their engagement with the insole and each including a staple-forming member and a toggle for operating it, each staple-forming member having a cutter movable therewith to cut from wire a piece to form a staple, and means arranged to act through the toggle of each mechanism first to move the mechanism heightwise of the shoe by reason of resistance of the wire to movement of the staple-forming member and cutter and then to operate said cutter and member to cut the wire and to form a staple by reason of resistance of the shoe to further movement of the mechanism heightwise thereof.

88. In a lasting machine, means for applying a binder about the toe end of an upper to hold the upper in lasted position in the angle between the feather and the lip of a welt shoe insole, mechanisms for forming staples and for driving them in directions widthwise of the shoe into the margin of the upper and the lip of the insole at the opposite sides of the shoe respectively to fasten the binder to the shoe, said mechanisms being mounted for movements heightwise of the shoe to position them relatively to the shoe and each including a staple-forming member movable thereafter to form a staple, and means for supplying wire to said mechanisms from which to form the staples, each mechanism having means for feeding the wire by the movement of the mechanism heightwise of the shoe.

89. In a lasting machine, means for applying a binder about the toe end of an upper to hold the upper in lasted position in the angle between the feather and the lip of a welt shoe insole, mechanisms for forming staples and for driving them in directions widthwise of the shoe into the margin of the upper and the lip of the insole at the opposite sides of the shoe respectively to fasten the binder to the shoe, said mechanisms being mounted for movements heightwise of the shoe to positions determined by their engagement with the insole and each including a staple-forming member movable thereafter to form a staple and a cutter for cutting from wire a piece of the proper length for the staple, and means for supplying wire to said mechanisms, the cutter of each mechanism being arranged to engage the wire and to feed it in response to the movement of the mechanism into insole-engaging position.

90. In a lasting machine, means for applying a binder about the toe end of an upper to hold the upper in lasted position in the angle between the feather and the lip of a welt shoe insole, mechanisms for forming staples and for driving them in directions widthwise of the shoe into the margin of the upper and the lip of the insole at the opposite sides of the shoe respectively to fasten the binder to the shoe, said mechanisms being mounted for movements heightwise of the shoe to positions determined by their engagement with the insole and each including a staple-forming member movable thereafter to form a staple and a cutter movable with said member to cut from wire a piece of the proper length for the staple, each mechanism further including a toggle for operating its staple-forming member and cutter, means for supplying wire to said mechanisms, and means arranged to act through the toggle of each mechanism to engage its cutter with the wire and to feed the wire by movement of the mechanism into insole-engaging position and thereafter to operate the cutter and the staple-forming member to cut the wire and to form the staple.

91. In a lasting machine, means for applying a binder about the toe end of an upper to hold the upper in lasted position in the angle between the feather and the lip of a welt shoe insole, mechanisms for forming staples and for driving them in directions widthwise of the shoe into the margin of the upper and the lip of the insole at the opposite sides of the shoe respectively to fasten the binder to the shoe, said mechanisms being mounted for movements heightwise of the shoe to position them relatively to the shoe and for return movements to starting positions after the driving of the staples, and means for conducting wire to said mechanisms from which to form the staples, each mechanism having means for feeding the wire by its movement into insole-engaging position and being movable relatively to the wire to receive a length of wire for the next staple in its return to starting position.

92. In a lasting machine, means for applying a binder about the toe end of an upper to hold the upper in lasted position in the angle between the feather and the lip of a welt shoe insole, mechanisms for forming staples and for driving them in directions widthwise of the shoe through the margin of the upper and the lip of the insole at the opposite sides of the shoe respectively to fasten the binder to the shoe, said mechanisms being mounted for movements heightwise of the shoe to positions determined by their engagement with the insole and for return movements to starting positions after the driving of the staples, and means for conducting wire to said mechanisms from which to form the staples, each mechanism including a cutter for engaging and feeding the wire by the movement of the mechanism into insole-engaging position and also a staple-forming member movable thereafter with the cutter to form a staple from a piece of wire severed by the cutter, each mechanism being movable relatively to the wire to receive a length of wire for the next staple in its return to starting position after retractive movement of the staple-forming member and cutter.

93. In a lasting machine, means for applying a binder about the toe end of an upper to hold the upper in lasted position in the angle between the feather and the lip of a welt shoe insole, mechanisms for forming staples and for driving them in directions widthwise of the shoe through the margin of the upper and the lip of the insole at the opposite sides of the shoe respectively to fasten the binder to the shoe, said mechanisms being mounted for movements heightwise of the shoe to positions determined by their engagement with the shoe prior to the forming and driving of the staples, and means for conducting wire to the mechanisms from which to form the staples, each mechanism having means for feeding the wire by its movement into insole-engaging position and being reversely movable relatively to the wire to a position determined by its engagement with the end of the wire after the staple-driving operation.

94. In a lasting machine, means for applying a binder about the toe end of an upper to hold the upper in lasted position in the angle between the feather and the lip of a welt shoe insole, and mechanisms for driving fastenings in directions widthwise of the shoe into the margin of the upper and the lip of the insole at the opposite sides of the shoe respectively to fasten the binder to the shoe, said mechanisms each including a throat member movable into engagement with the margin of the upper for guiding a fastening, a driver for driving the fastening, and toggles associated respectively with said throat member and driver for operating them.

95. In a lasting machine, means for applying a binder about the toe end of an upper to hold the upper in lasted position in the angle between the feather and the lip of a welt shoe insole, and mechanisms for driving fastenings in directions widthwise of the shoe into the margin of the upper and the lip of the insole at the opposite sides of the shoe respectively to fasten the binder to the shoe, said mechanisms each including a throat member movable into engagement with the margin of the upper for guiding a fastening, a driver for driving the fastening, and toggles associated respectively with said throat member and driver for operating them, the mechanisms being movable as units heightwise of the shoe to positions determined by their engagement with the insole prior to the driving of the fastenings.

96. In a lasting machine, means for applying a binder about the toe end of an upper to hold the upper in lasted position in the angle between the feather and the lip of a welt shoe insole, and mechanisms for forming staples and for driving them in directions widthwise of the shoe into the margin of the upper and the lip of the insole at the opposite sides of the shoe respectively to fasten the binder to the shoe, said mechanisms each including a member movable to form a staple, a staple driver, and toggles associated respectively with said member and driver for operating them, the mechanisms being movable as units heightwise of the shoe to positions determined by their engagement with the insole prior to the forming and driving of the staples.

97. In a lasting machine, means for applying a binder about the toe end of an upper to hold the upper in lasted position in the angle between the feather and the lip of a welt shoe insole, mechanisms for driving fastenings in directions widthwise of the shoe into the margin of the upper and the lip of the insole at the opposite sides of the shoe respectively to fasten the binder to the shoe, said mechanisms being movable heightwise of the shoe to positions determined by their engagement with the insole and each including members relatively movable to clamp the margin of the upper and the lip between them and also a driver for driving a fastening, cylinder-and-piston devices associated respectively with the different mechanisms for moving them heightwise of the shoe and for effecting the relative movements of their clamping members by fluid pressure, and other cylinder-and-piston devices connected respectively to the different drivers for operating them.

98. In a lasting machine, means for applying a binder about the toe end of an upper to hold the upper in lasted position in the angle between the feather and the lip of a welt shoe insole, mechanisms for forming staples and for driving them in directions widthwise of the shoe into the margin of the upper and the lip of the insole at the opposite sides of the shoe respectively to fasten the binder to the shoe, said mechanisms being movable heightwise of the shoe to positions determined by their engagement with the insole and each including a member movable to form a staple and a staple driver, cylinder-and-piston devices associated respectively with the different mechanisms for moving them heightwise of the shoe and for operating their staple-forming members by fluid pressure, and other cylinder-and-piston devices connected respectively to the different drivers for operating them.

99. In a lasting machine, means for applying a binder about the toe end of an upper to hold the upper in lasted position in the angle between the feather and the lip of a welt shoe insole, mechanisms for driving fastenings in directions widthwise of the shoe into the margin of the upper and the lip of the insole at the opposite sides of the shoe respectively to fasten the binder to the shoe, said mechanisms being mounted for movements heightwise of the shoe to positions determined by their engagement with the shoe and each including a driver for driving a fastening, cylinder-and-piston devices associated respectively with the different mechanisms for moving them heightwise of the shoe by fluid pressure, and other cylinder-and-piston devices connected respectively to the different drivers for operating them.

100. In a lasting machine, means for applying a binder about the toe end of an upper to hold the upper in lasted position in the angle between the feather and the lip of a welt shoe insole, drivers for driving fastenings in directions widthwise of the shoe into the margin of the upper and the lip of the insole at the opposite sides of the shoe respectively to fasten the binder to the shoe, clamping members associated with each of said drivers and relatively movable to clamp the margin of the upper and the lip between them prior to the driving of the fastenings, fluid-pressure means for effecting the relative movements of said clamping members, additional fluid-pressure means to which fluid is admitted prior to the completion of the relative movements of the clamping members for operating the drivers, and means for locking the drivers against operative movements until the relative movements of said clamping members have been substantially completed and for then releasing them.

101. In a lasting machine, means for applying a binder about the toe end of an upper to hold the upper in lasted position in the angle between the feather and the lip of a welt shoe insole, drivers for driving fastenings in directions widthwise of the shoe into the margin of the upper and the lip of the insole at the opposite sides of the shoe respectively to fasten the binder to the shoe, throat members movable into engagement with the upper for guiding the fastenings, toggles for thus moving said throat members, fluid-pressure means for operating said toggles, additional fluid-pressure means to which fluid is admitted prior to the completion of the movements of the throat members for operating the drivers, and devices controlled by said toggles for locking the drivers against operative movements until the movements of said throat members have been substantially completed and for then releasing them.

102. In a lasting machine, means for applying a binder about the toe end of an upper to hold the upper in lasted position in the angle between the feather and the lip of a welt shoe insole, drivers for driving fastenings in directions widthwise of the shoe into the margin of the upper and the lip of the insole at the opposite sides of the shoe respectively to fasten the binder to the shoe, throat members movable into engagement with the upper for guiding the fastenings, means for thus moving the throat members by fluid pressure, additional fluid-pressure means to which fluid is admitted prior to the completion of the movements of the throat members for operating the drivers, and stops for preventing the operative movements of the drivers until the movements of the throat members have been substantially completed, said stops being displaceable by the means for moving the throat members.

103. In a lasting machine, means for applying a binder about the toe end of an upper to hold the upper in lasted position in the angle between the feather and the lip of a welt shoe insole, drivers for driving staples in directions widthwise of the shoe into the margin of the upper and the lip of the insole at the opposite sides of the shoe respectively to fasten the binder to the shoe, staple-forming members associated respectively with the different drivers and movable to form staples, fluid-pressure means for thus moving the staple-forming members, additional fluid-pressure means to which fluid is admitted prior to the completion of the movements of the staple-forming members for operating the drivers, and means for holding the drivers against operative movements until the movements of the staple-forming members have been substantially completed and for then releasing them.

104. In a lasting machine, means for applying a binder about the toe end of an upper to hold the upper in lasted position in the angle between the feather and the lip of a welt shoe insole, drivers for driving fastenings in directions widthwise of the shoe into the margin of the upper and the lip of the insole at the opposite sides of the shoe respectively to fasten the binder to the shoe, throat members movable into engagement with the upper for guiding the fastenings, fluid-pressure means including cylinders for receiving fluid thus to move said throat members, and additional fluid-pressure means including cylinders arranged to receive fluid from said first-named cylinders to operate the drivers.

105. In a lasting machine, means for applying a binder about the toe end of an upper to hold the upper in lasted position in the angle between the feather and the lip of a welt shoe insole, drivers for driving fastenings in directions widthwise of the shoe into the margin of the upper and the lip of the insole at the opposite sides of the shoe respectively to fasten the binder to the shoe, throat members movable into engagement with the upper for guiding the fastenings, fluid-pressure means including cylinders and pistons movable therein thus to move said throat members, and additional fluid-pressure means for operating the drivers, said cylinders having ports arranged to be uncovered by the movements of their pistons for admitting fluid to said additional fluid-pressure means.

106. In a lasting machine, means for applying a binder about the toe end of an upper to hold the upper in lasted position in the angle between the feather and the lip of a welt shoe insole, drivers for driving fastenings in directions widthwise of the shoe into the margin of the upper and the lip of the insole at the opposite sides of the shoe respectively to fasten the binder to the shoe, throat members movable into engagement with the upper for guiding the fastenings, fluid-pressure means including cylinders and pistons movable therein thus to move said throat members, additional fluid-pressure means for operating the drivers, said cylinders having ports arranged to be uncovered by the movements of their pistons for admitting fluid to said additional fluid-pressure means prior to the completion of the movements of the throat members, and means for holding the drivers against operative movements until the movements of the throat members have been substantially completed and for then releasing them.

107. In a lasting machine, means for applying a binder about the toe end of an upper to hold the upper in lasted position in the angle between the feather and the lip of a welt shoe insole, drivers for driving fastenings in directions widthwise of the shoe into the margin of the upper and the lip of the insole at the opposite sides of the shoe respectively to fasten the binder to the shoe, throat members movable inwardly widthwise of the shoe into engagement with the upper and having passageways for guiding the fastenings, and devices controlled by said throat members for engaging portions of the binder adjacent to said members and for positioning them heightwise of the shoe in proper relation to said passageways.

108. In a lasting machine, means for applying a binder about the toe end of an upper to hold the upper in lasted position in the angle between the feather and the lip of a welt shoe insole, drivers for driving fastenings in directions widthwise of the shoe into the margin of the upper and the lip of the insole at the opposite sides of the shoe respectively to fasten the binder to the shoe, throat members movable inwardly widthwise of the shoe into engagement with the upper and having passageways for guiding the fastenings, and devices movable inwardly with said throat members and also movable relatively to them heightwise of the shoe for engaging portions of the binder adjacent to said members and for positioning them in proper relation to said passageways.

109. In a lasting machine, means for applying a binder about the toe end of an upper to hold the upper in lasted position in the angle between the feather and the lip of a welt shoe insole, drivers for driving fastenings in directions widthwise of the shoe into the margin of the upper and the lip of the insole at the opposite sides of the shoe respectively to fasten the binder to the shoe, throat members movable inwardly widthwise of the shoe into engagement with the upper and having passageways for guiding the fastenings, fingers movable inwardly with said throat members to positions between the binder and the upper overlying the feather of the insole, and means for moving said fingers heightwise of the shoe to position portions of the binder adjacent to the throat members in proper relation to said passageways.

110. In a lasting machine, means for applying a binder about the toe end of an upper to hold the upper in lasted position in the angle between the feather and the lip of a welt shoe insole, drivers for driving fastenings in directions widthwise of the shoe into the margin of the upper and the lip of the insole at the opposite sides of the shoe respectively to fasten the binder to the shoe, throat members movable inwardly widthwise of the shoe into engagement with the upper and having passageways for guiding the fastenings, fingers movable inwardly with said throat members to positions between the binder and the upper on the feather of the insole, the throat members being further movable relatively to said fingers, and means for moving the fingers heightwise of the shoe by such further movements of the throat members to position portions of the binder adjacent to said members in proper relation to said passageways.

111. In a power-operated lasting machine, means for working the toe-end portion of an upper into lasted position and for applying a binder about the toe to hold the upper in the course of a cycle of automatic operations of the machine, automatic means for interrupting the cycle of operations, and power-operated means for fastening the binder to the shoe during the ensuing pause in the cycle.

112. In a power-operated lasting machine, means for working the toe-end portion of an upper into lasted position and for applying a binder about the toe to hold the upper in the course of a cycle of automatic operations of the machine, automatic means for interrupting the cycle of operations, power-operated means for fastening the binder to the shoe during the ensuing pause in the cycle, and automatic means for starting the operation of said power-operated means.

113. In a power-operated lasting machine, means for working the toe-end portion of an upper into lasted position and for applying a binder about the toe to hold the upper in the course of a cycle of automatic operations of the machine, a clutch through which the cycle of operations is performed, automatic means for interrupting the cycle of operations by control of said clutch, and fluid-operated means for fastening the binder to the shoe during the ensuing pause in the cycle.

114. In a power-operated lasting machine, means for working the toe-end portion of an upper into lasted position and for applying a binder about the toe to hold the upper in the course of a cycle of automatic operations of the machine, automatic means for interrupting the cycle of operations, fluid-operated means for fastening the binder to the shoe during the ensuing pause in the cycle, and automatically operated valve mechanism for initiating the operation of said fluid-operated means.

115. In a power-operated lasting machine, means for working the toe-end portion of an upper into lasted position and for applying a binder about the toe to hold the upper in the course of a cycle of automatic operations of the machine, automatic means for interrupting the cycle of operations, fluid-operated means for fastening the binder to the shoe during the ensuing pause in the cycle, means for admitting operating fluid to said fluid-operated means, and a fluid-operated device for effecting release of the fluid from said fluid-operated means after the fastening of the binder.

116. In a power-operated lasting machine, means for working the toe-end portion of an upper into lasted position and for applying a binder about the toe to hold the upper in the course of a cycle of automatic operations of the machine, automatic means for interrupting the cycle of operations, fluid-operated means for fastening the binder to the shoe during the ensuing pause in the cycle, a valve for admitting operating fluid to said fluid-operated means, automatic means for moving the valve into position thus to admit the fluid, and means controlled by the pressure of the fluid for moving the valve into position to release the fluid from said fluid-operated means after the fastening of the binder.

117. In a power-operated lasting machine, means for working the toe-end portion of an upper into lasted position and for applying a binder about the toe to hold the upper in the course of a cycle of automatic operations of the machine, automatic means for interrupting the cycle of operations, fluid-operated means for fastening the binder to the shoe during the ensuing pause in the cycle, a valve for admitting operating fluid to said fluid-operated means, automatic means for moving the valve into position thus to admit the fluid, a latch for holding the valve in that position, a device movable in response to increase of pressure of the fluid after the fastening of the binder for operating said latch to release the valve, and a spring for moving the valve into position to release the fluid from said fluid-operated means upon release of the valve by the latch.

118. In a power-operated lasting machine, means for working the toe-end portion of an upper into lasted position and for applying a binder about the toe to hold the upper in the course of a cycle of automatic operations of the machine, automatic means for interrupting the cycle of operations, power-operated means for fastening the binder to the shoe during the ensuing pause in the cycle, and means controlled by said power-operated fastening means to cause the machine to resume its cycle of operations.

119. In a power-operated lasting machine, means for working the toe-end portion of an upper into lasted position and for applying a binder about the toe to hold the upper in the course of a cycle of automatic operations of the machine, automatic means for interrupting the cycle of operations, power-operated means for fastening the binder to the shoe during the ensuing pause in the cycle, said fastening means being movable into position to operate on the shoe and reversely movable after the fastening of the binder, and means to cause the machine to resume its cycle of operations in response to such reverse movement of said fastening means.

120. In a power-operated lasting machine, means for working the toe-end portion of an upper into lasted position and for applying a binder about the toe to hold the upper in the course of a cycle of automatic operations of the machine, automatic means for interrupting the cycle of operations, means for fastening the binder to the shoe during the ensuing pause in the cycle, fluid-operated means for moving said fastening means into position to operate on the shoe and for then operating it, spring means for moving said fastening means reversely away from the shoe after the fastening of the binder, and means to cause the machine to resume its cycle of operations in response to the reverse movement of said fastening means.

121. In a power-operated lasting machine, means for working the toe-end portion of an upper into lasted position and for applying a binder about the toe to hold the upper in the course of a cycle of automatic operations of the machine, a clutch through which the cycle of operations is performed, automatic means for interrupting the cycle of operations by control of said clutch, fluid-operated means for fastening the binder to the shoe during the ensuing pause in the cycle, and electrical means controlled by said fluid-operated means for actuating said clutch to cause the machine to resume its cycle after the fastening of the binder.

122. In a power-operated lasting machine, means for working the toe-end portion of an upper into lasted position and for applying a binder about the toe to hold the upper in the course of a cycle of automatic operations of the machine, a clutch through which the cycle of operations is performed, automatic means for interrupting the cycle of operations by control of said clutch, fluid-operated means for fastening the binder to the shoe during the ensuing pause in the cycle, said fluid-operated means being movable toward the shoe prior to the fastening of the binder and reversely movable thereafter away from the shoe, and electrical means for actuating said clutch to cause the machine to resume its cycle in response to the reverse movement of said fluid-operated means.

123. In a power-operated lasting machine, means for wiping the marginal portion of an upper about the toe end of a last inwardly over an insole on the last and against a lip on the insole and for also applying a binder about the toe to hold the upper against the lip in the course of a cycle of automatic operations of the machine, automatic means for interrupting the cycle of operations, and power-operated devices for inserting fastenings in directions widthwise of the shoe into the upper and the lip of the insole at the opposite sides of the shoe respectively to fasten the binder to the shoe during the ensuing pause in the cycle.

124. In a power-operated lasting machine, means for wiping the marginal portion of an upper about the toe end of a last inwardly over an insole on the last and against a lip on the insole and for also applying a binder about the toe to hold the upper against the lip in the course of a cycle of automatic operations of the machine, automatic means for interrupting the cycle of operations, devices for inserting fastenings into the upper and the lip of the insole in directions widthwise of the shoe at the opposite sides of the shoe respectively to fasten the binder to the shoe, said devices being mounted for movements heightwise of the shoe into positions to operate thereon, and power-operated means for thus moving said devices and for then operating them to insert the fastenings during the pause in the cycle after it is thus interrupted.

125. In a power-operated lasting machine, means for wiping the marginal portion of an upper about the toe end of a last inwardly over an insole on the last and against a lip on the insole and for also applying a binder about the toe to hold the upper against the lip in the course of a cycle of automatic operations of the machine, a clutch through which the cycle of operations is performed, automatic means for interrupting the cycle of operations by control of said clutch, devices for inserting fastenings into the upper and the lip of the insole in directions widthwise of the shoe at the opposite sides of the shoe respectively to fasten the binder to the shoe, fluid-operated means for operating said devices to insert the fastenings during the pause in the cycle after it is thus interrupted, and automatic means for initiating the operation of said fluid-operated means.

126. In a power-operated lasting machine, means for wiping the marginal portion of an upper about the toe end of a last inwardly over an insole on the last and against a lip on the insole and for also applying a binder about the toe to hold the upper against the lip in the course of a cycle of automatic operations of the machine, automatic means for interrupting the cycle of operations, devices for inserting fastenings into the upper and the lip of the insole in directions widthwise of the shoe at the opposite sides of the shoe respectively to fasten the binder to the shoe during the pause in the cycle after it is thus interrupted, means for moving said devices heightwise of the shoe into positions to operate thereon and for thereafter moving them reversely to starting positions, and means controlled by the reverse movements of both said devices to cause the machine to resume its cycle only if both devices have substantially completed their reverse movements to starting positions.

127. In a power-operated lasting machine, means for wiping the marginal portion of an upper about the toe end of a last inwardly over an insole on the last and against a lip on the insole and for also applying a binder about the toe to hold the upper against the lip in the course of a cycle of automatic operations of the machine, a clutch through which the cycle of operations is performed, automatic means for interrupting the cycle of operations by control of said clutch, fluid-operated devices for inserting fastenings into the upper and the lip of the insole in directions widthwise of the shoe at the opposite sides of the shoe respectively to fasten the binder to the shoe during the pause in the cycle after it is thus interrupted, said devices being movable heightwise of the shoe to fastening-inserting positions and reversely movable thereafter to starting positions, and electrical means controlled by both said devices for actuating said clutch to cause the machine to resume its cycle of operations only if both devices have substantially completed their reverse movements to starting positions.

128. In a power-operated lasting machine, means for working the toe-end portion of an upper into lasted position and for applying a binder about the toe to hold the upper in the course of a cycle of automatic operations of the machine, automatic means for interrupting the cycle of operations, power-operated means for fastening the binder to the shoe during the ensuing pause in the cycle, automatic means for starting the operation of said power-operated means, and means for preventing at the will of the operator the operation of said automatic starting means.

129. In a power-operated lasting machine, means for working the toe-end portion of an upper into lasted position and for applying a binder about the toe to hold the upper in the course of a cycle of automatic operations of the machine, automatic means for interrupting the cycle of operations, fluid-operated means for fastening the binder to the shoe during the ensuing pause in the cycle, a valve for admitting operating fluid to said fluid-operated means, automatic means for operating the valve thus to admit the fluid, and means movable at the will of the operator into position to prevent such operation of the valve.

130. In a power-operated lasting machine, means for working the toe-end portion of an upper into lasted position and for applying a binder about the toe to hold the upper in the course of a cycle of automatic operations of the machine, automatic means for interrupting the cycle of operations, power-operated means for inserting fastenings to fasten the binder to the shoe during the ensuing pause in the cycle, automatic means for starting the operation of said fastening-inserting means, and additional means movable at the will of the operator to start the operation of said fastening-inserting means independently of the cycle of operations of the machine.

131. In a power-operated lasting machine, means for working the toe-end portion of an upper into lasted position and for applying a binder about the toe to hold the upper in the course of a cycle of automatic operations of the machine, automatic means for interrupting the cycle of operations, fluid-operated means for inserting fastenings to fasten the binder to the shoe during the ensuing pause in the cycle, and automatically controlled valve means for admitting fluid to said fluid-operated means, said valve means being further subject to control by the operator thus to admit the fluid independently of the cycle of operations of the machine.

CHARLES A. ROBINSON.

REFERENCES CITED

The following references are of record in the file of this patent:

UNITED STATES PATENTS

| Number | Name | Date |
|---|---|---|
| 2,160,846 | Eastman et al. | June 6, 1939 |
| 810,773 | Kron | Jan. 23, 1906 |
| 1,033,945 | Russell | July 30, 1912 |
| 2,000,912 | Bates | May 14, 1935 |